(12) United States Patent
Samra et al.

(10) Patent No.: US 6,873,344 B2
(45) Date of Patent: Mar. 29, 2005

(54) MEDIA PRODUCTION SYSTEM USING FLOWGRAPH REPRESENTATION OF OPERATIONS

(75) Inventors: Sukendeep Samra, Venice, CA (US); Bruno Sargeant, North Yorkshire (GB); Junichi Tsukamoto, Marina del Rey, CA (US); Sidhartha Deb, Venice, CA (US); Makoto Kawamura, Tokyo (JP); Shingo Kawabe, Marina del Rey, CA (US); Mark A. van den Bergen, Victoria (AU); Farhana Bandukwala, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 296 days.

(21) Appl. No.: 09/929,400

(22) Filed: Aug. 13, 2001

(65) Prior Publication Data

US 2002/0140707 A1 Oct. 3, 2002

Related U.S. Application Data

(60) Provisional application No. 60/271,376, filed on Feb. 22, 2001, and provisional application No. 60/284,660, filed on Apr. 17, 2001.

(51) Int. Cl.$^7$ .................................................. G09G 5/00
(52) U.S. Cl. ........................ 345/723; 345/726; 345/716
(58) Field of Search ........................ 345/700, 723–726, 345/762–763, 810, 853, 420, 619

(56) References Cited

U.S. PATENT DOCUMENTS 5,438,654 A * 8/1995 Drebin et al. ............... 345/667
5,517,607 A * 5/1996 Nishimura et al. .......... 345/853
5,844,563 A * 12/1998 Harada et al. ............... 345/420
5,852,449 A * 12/1998 Esslinger et al. ............ 345/473
5,982,350 A * 11/1999 Hekmatpour et al. ........ 345/629
6,750,890 B1 * 6/2004 Sugimoto .................... 345/838

* cited by examiner

Primary Examiner—Matthew C. Bella
Assistant Examiner—Po-Wei Chen
(74) Attorney, Agent, or Firm—Charles J. Kulas; Carpenter & Kulas, LLP

(57) ABSTRACT

A system for processing images, or clips, as, for example, in a movie or video post production system. The clips are associated with a flowgraph representation that visually depicts all of the operations used to generate the clips. Correspondence between the image and flowgraph representations is tightly maintained so that the user can conveniently switch between, and work among, the different representations. Efficient user interface mechanisms are provided to work with flowgraph items to construct nodes representing operations. Nodes can be joined in an automated, or assisted, manner. Flowgraphs can be automatically generated according to user inputs in other parts of the system. For example, layered effects can have flowgraphs that are automatically generated. A freehand drawing timing capture tool is provided. All operations that contribute to a single (or more) pixel's value can be listed and selectively activated or deactivated to detect a problem. Any input mechanism can be bookmarked with a labeled value so that the labeled value can be called up at a later time to restore a setting, or multiple settings. A method for using a trilinear look-up table to computer various functions where the table resolution can change is disclosed.

17 Claims, 15 Drawing Sheets

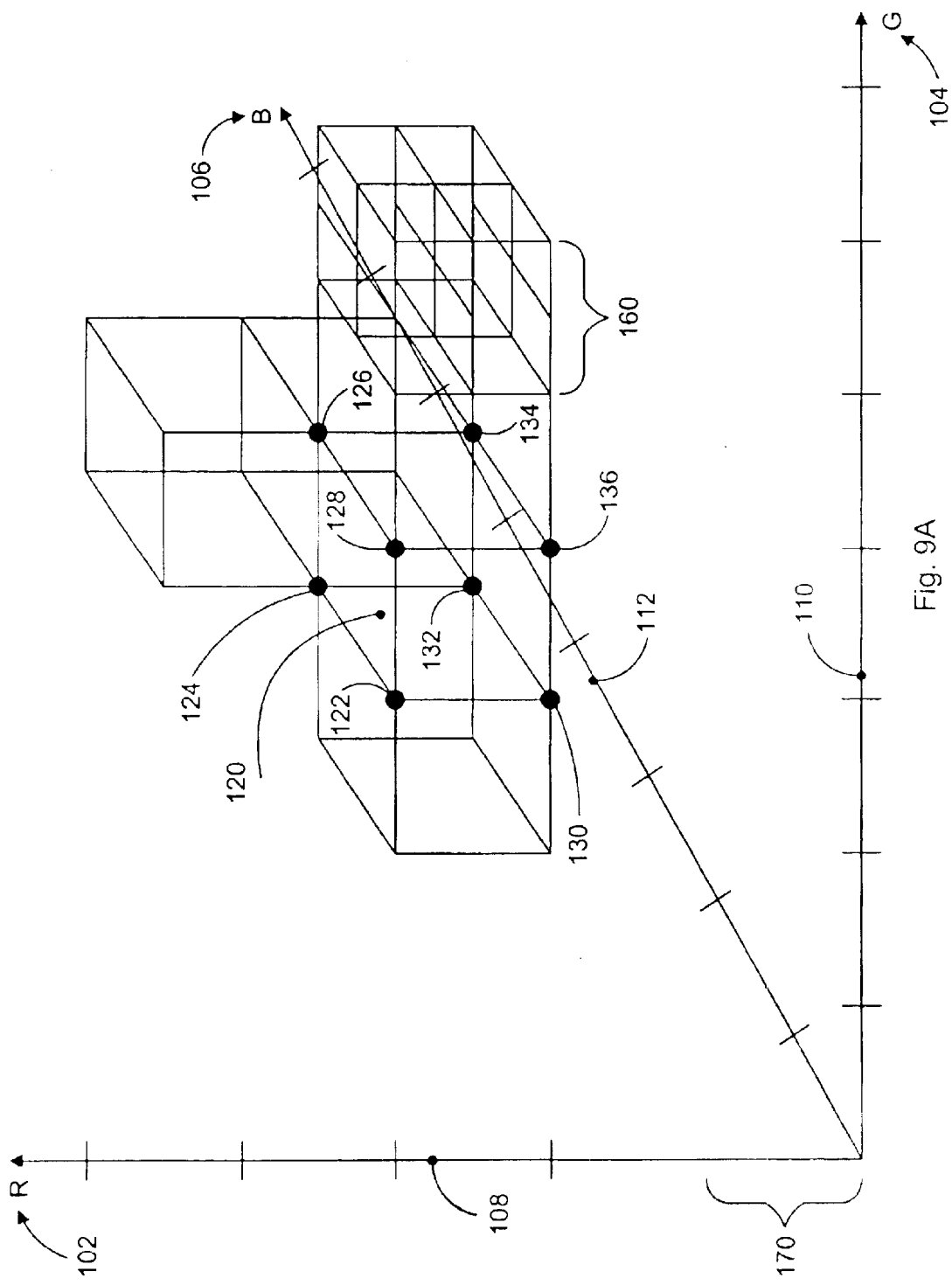

MEDIA PRODUCTION SYSTEM USING FLOWGRAPH REPRESENTATION OF OPERATIONS

CLAIM OF PRIORITY

This application claims priority from the following co-pending U.S. Provisional Patent Applications:

1. Application Ser. No. 60/271,376; filed Feb. 22, 2001, entitled "A System and Method for Editing" (client docket 50P4410); and
2. Application Ser. No. 60/284,660; filed Apr. 17, 2001, entitled "Advanced System and Method for Editing" (client docket 50R4639).

CROSS-REFERENCE TO RELATED APPLICATIONS

This application is related to the following co-pending U.S. Patent Applications:

1. Application Ser. No. 09/665,721; filed Sep. 18, 2000, entitled "System And Method For Optimizing The Processing Of Images" (client docket 50N3647);
2. Application Ser. No. 09/691,795; filed Oct. 18, 2000, "System And Method For Increasing Performance When Compositing Images" (client docket 50N3649);
3. U.S. Ser. No. 09/929,276 filed Aug. 13, 2001 entitled "User Interface for Generating Parameter Values in Media Presentations Based on Selected Presentation Instances" (attorney docket 20699-45);
4. U.S. Ser. No. 09/929,526 filed Aug. 13, 2001 entitled "Collaborative Computer-Based Production System Including Annotation, Versioning and Remote Interaction" (attorney docket 20699-46); and,
5. U.S. Ser. No. 09/930,115 filed Aug. 14, 2001 entitled "User Interface for a Digital Production System Including Multiple Viewing and Navigating" (attorney docket 20699-48);

BACKGROUND OF THE INVENTION

This invention relates in general to digital processing systems and more specifically to a digital processing system using a graphical representation of operations to advantageously accomplish processing of digital media productions.

Today's digital processing systems are used in many applications. One intensive application area uses digital production systems to create and process movies, video, animation, audio and other types of digital media. Such systems are referred to as production systems.

The demand on a production system is extremely high. A huge amount of information is present in even a few frames (less than one second) of a visual production, such as a movie. The type and number of possible complex operations that can performed on a movie require enormous processing power. Production systems provide incredible flexibility in applying different operations such as effects, transitions, editing, adjustments and other modifications. Each of dozens, or more, types of operations may in themselves have many different parameters, or other characteristics, which can be modified. The selection and application of operations on hundreds of selected areas of frames, clips and other parts of a production has become a highly specialized and complex task.

For example, a typical operation may be to composite two images together. The decision to perform a composite operation leads a human user of a production system down a path of myriad choices such as selecting frames or clips for compositing, cropping and scaling the images, performing color correction, erosion, blurring, light balancing, creating masks, etc. Several sets of operations may be required for different portions within a single frame, or screen area of a clip.

In present systems, the user interface (i.e., the display and user input devices) of productions systems becomes of great importance. Any improvement in ease of use and efficiency is often realizes a huge benefit in decreasing production times and providing better production results. However, the design of such user interfaces is difficult because the production system is usually limited to a relatively small display area (e.g., 1 or two display screens) to both display and play back the media, and to provide controls for navigating among thousands or production parts and for applying the complex operations.

Thus, it is desirable to provide an invention that improves upon the prior art user interfaces in production systems.

BRIEF SUMMARY OF THE INVENTION

In one embodiment the invention provides a system for modifying digital images, the system comprising means for maintaining an association between an image portion and a list of operations used to create the image portion.

In another embodiment the invention provides a method for processing an image in an application program, wherein the application program executes in a digital system, wherein the digital system includes a user input device, the method comprising accepting signals from the user input device to cause one or more operations to modify the image to create a modified image; creating a list of at least one of the operations used to create the modified image; and storing the list in association with the modified image.

In another embodiment the invention provides a method for modifying a digram of connected nodes displayed on a display device in a digital system, wherein the nodes are connected with elongated connectors, wherein the digital system includes a user input device and a processor, the method comprising accepting first signals from the user input device to remove an end of a connector from a first node;

accepting second signals from the user input device to move the end of the connector in proximity to a second node; using the processor to indicate that the second node has been automatically selected;

accepting third signals from a user input device to indicate that the end of the connector should be connected to the second node; and using the processor to automatically connect the end of the connector to the second node.

In another embodiment the invention provides a method for joining nodes in a diagram, wherein the diagram includes a first node and a second node, the method comprising, the method comprising accepting first signals from the user input device to move the first node into visible contact with the second node; and in response to the moving of the first node into visible contact with the second node, performing the step of using the processor to create a connection between the first and second nodes.

In another embodiment the invention provides a method for modifying a diagram of nodes in a digital processing system, wherein the diagram includes nodes coupled by connectors, wherein a node represents an operation performed on an image portion, wherein a complex node represents an operation that includes sub-operations, the method comprising accepting signals from a user input device to expand a complex node; and in response to the step of accepting signals to expand a complex node, performing the step of replacing the complex node in the diagram with one or more nodes corresponding to sub-operations of the operation represented by the complex node.

In another embodiment the invention provides a method for modifying parameter values, the method executing in a digital system, the digital system including a user input device, the method comprising accepting signals from the user input device to define a freehand line drawing; and using the freehand line drawing to modify at least one parameter value.

In another embodiment the invention provides a method for displaying image information on a display device coupled to a processor and user input device, the method comprising using the processor to display a main image on the display device; generating modified images; accepting signals from the user input device to select a plurality of modified images; and in response to the step of accepting signals, performing the step of displaying the plurality of selected images on the display device adjacent to the main image.

In another embodiment the invention provides a method for displaying information about an image in a image processing system, the image processing system including a processor coupled to a display device and to a user input device, the method comprising using the processor to display an image; accepting signals from the user input device to select a portion of the image; and using the processor to display a list of operations that contributed to the generation of the selected portion of the image.

In another embodiment the invention provides a method for saving a setting in a computer user interface, the method executing in a digital processing system including a processor coupled to at least one user input device and to a display device, the processor executing a user interface including controls for changing parameter values, the method comprising accepting signals from a user input device to provide a new parameter value by using a first control; accepting signals from a user input device to define a first label; associating the label with the new parameter value and with the first control; storing the label in a list of labels associated with the first control; using the processor to display the list of labels; accepting second signals from a user input device to select the first label; and in response to the step of accepting second signals, performing the step of using the new parameter value.

In another embodiment the invention provides a method for using a three-dimensional look-up table in a digital storage device to obtain a result, the method comprising selecting a first resolution; using the first resolution to define subcubes in a mapping space, wherein the subcubes have dimensions based on the first resolution; assigning a single output value to each subcube; generating a look-up table in accordance with the subcubes; receiving a first set of three values; using the mapping space to map the first set of three values to a point in the mapping space, wherein if the point is within a given subcube then the result is the assigned output value of the given subcube; and regenerating the look-up table at a different resolution.

The present invention provides features whereby image content in a media production system is associated with a visual flowgraph representation of the operations used to create, or derive, the image content. A comprehensive association is maintained between production parts in image space and in flowgraph space. This allows a user to quickly move between working with an image representation of a part and the flowgraph (i.e., visual display of operations) representation.

BRIEF DESCRIPTION OF THE DRAWINGS

FIG. 9A shows a mapping space and subcubes illustrating a trilinear look-up table aspect of the present invention.

DETAILED DESCRIPTION OF THE INVENTION

A specific, preferred embodiment, production system is referred to as "Socratto" which is developed and marketed by VFX, a division of Sony Corporation. Although aspects of the present invention are described in connection with the Socratto system, it should be apparent that the invention is suitable for use with many different productions systems having different ways to present information and to accept user inputs. Also, although the invention is described herein primarily with reference to film or video production systems, the invention is applicable to other types of media production systems such as computer-aided design, audio, animation, modeling, etc. Various aspects of the invention are applicable to any type of application program or functional system.

Figure 1A:
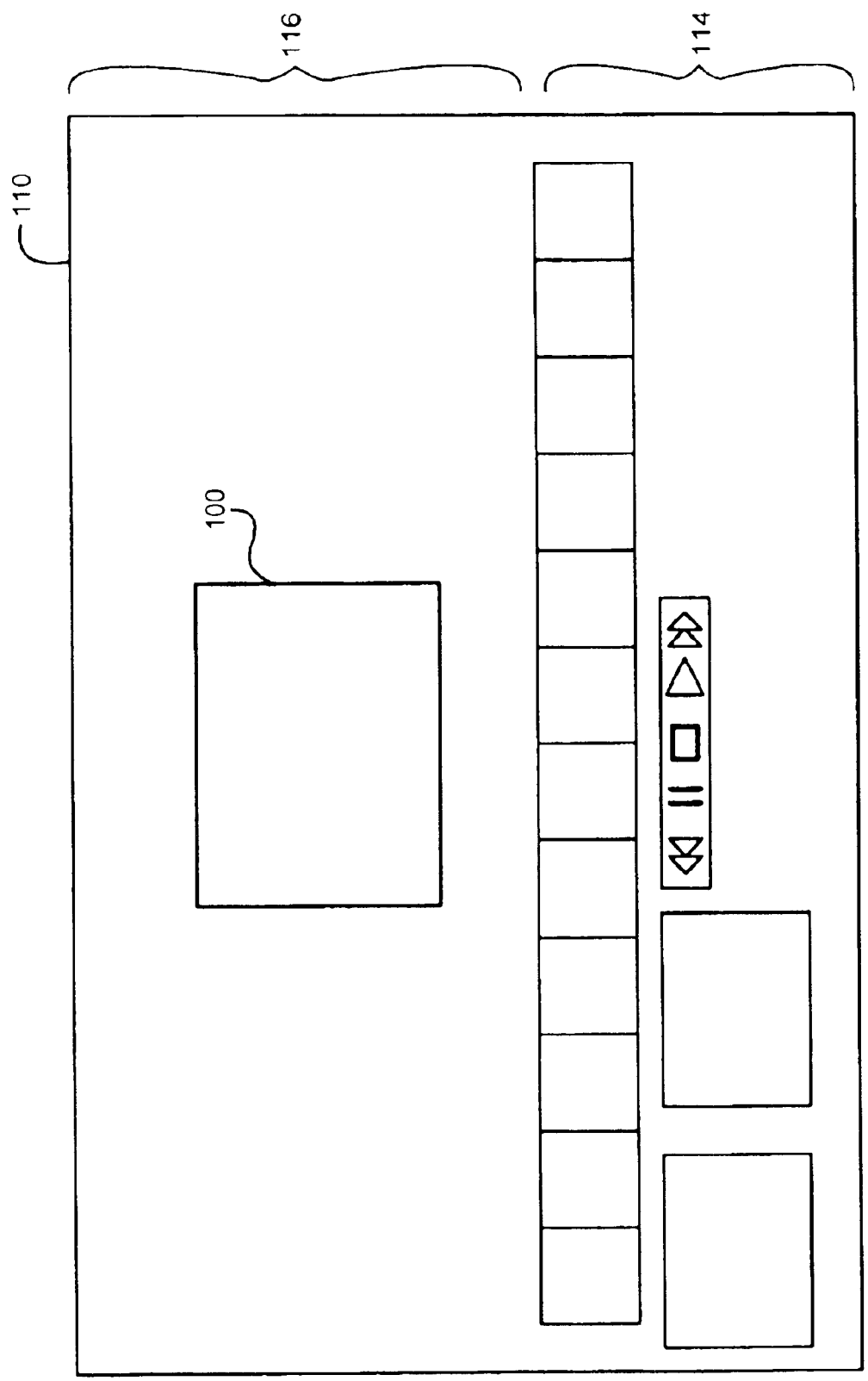
FIG. 1A shows a first screen display of the user interface of the present invention.

FIG. 1A shows a first screen display of the user interface.

In FIG. 1A, display screen 110 is used to display first panel area 116 and second panel area 114. In the preferred embodiment, first panel area is used to display images, clips and a "flowgraph" diagram depending on the current activity of the user. Second panel area 114 includes user interface controls that can change, as needed, in accordance with the display and operation of the first panel area. The preferred embodiment of the invention uses the lower panel as the primary control area so that the more substantial portion of the display screen defined by the first panel is available for frame and clip playback and for display of flowgraphs (which can become complex). Naturally, any arrangement of panels, orientation of display areas and controls, or other use of one or more display screens to effect a user interface display is possible.

Figure 1B:
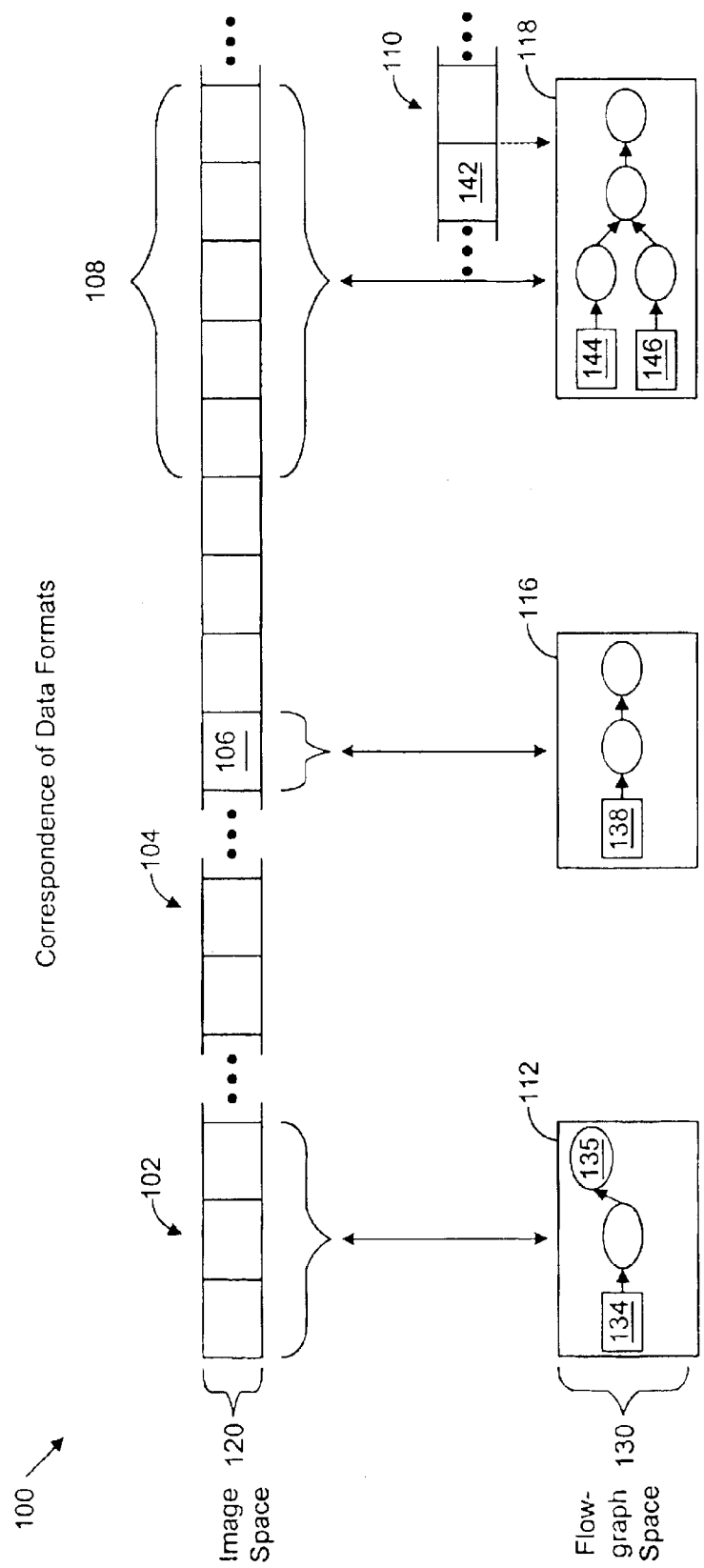
FIG. 1B illustrates the correspondence of flowgraph representations to image representations.

FIG. 1B illustrates the correspondence of flowgraph representations to image representations.

In FIG. 1B, image space 120 is a conceptual category that includes visual presentation of images. Such images can be bitmap, vector representation, photographic projection or other type of digital or non-digital data formats. Image space is useful to present a large amount of visual information to a human user, as where a frame is displayed or a clip is played back. Because of the innate ability of humans to process very large amounts of visual information almost instantaneously, image space representation is an efficient and important way for users to, e.g., compare image results, predict anticipated changes and necessary operations, determine when a desired result is achieved, etc. Further, image space representation is the ultimate form that a completed production assumes.

Frames, or images, such as frame 132, 136 and 140 exist in image space. Clips typically include multiple frames and also exist in image space. Clips 102, 104 and 110 are shown in FIG. 1B. Clip section 108 is also shown, along with other frames and clip portions, not referenced. In a preferred embodiment, groups of clips and frames can be organized into a "reel." The frames and clips in FIG. 1B can be considered part of a single reel, but any type of organization is possible. In general, although reference is made to specific types of production parts such as frames, images, clips, clip sections, frame layers, etc., any production part, group of parts, or portion of a part can be included.

Flowgraph space 130 is a second conceptual category that includes a visual presentation of operations that are performed to generate a production part. In a preferred embodiment, flowgraphs are associated with clips or clip sections (including single frames or portions of frames). The associations can be one-to-one, one-to-many or many-to-one; although a preferred embodiment maintains a one-to-one relationship between each unique clip section and the flowgraph that generated it. Any manner of correspondence or associations among production parts and clips are possible.

In FIG. 1B, flowgraph 112 is associated with clip 102. Clip 104 does not have a flowgraph associated with it. Frame 106 is associated with flowgraph 116. Clip section 108 is associated with flowgraph 118. Clip 110 is not associated with flowgraph 118 since clip 110 is merely used as an input to create clip 108, as discussed, below.

Each flowgraph's associated part represents the output of the operations that the flowgraph describes. For example, In FIG. 1B, flowgraph 112 starts with clip 134 and performs operations on the clip as represented by the oval nodes and connectors of the flowgraph. Flowgraph diagrams are discussed in more detail, below. The output of flowgraph 112 is represented in flowgraph space as node 135 of flowgraph 112. The output is represented in image space as clip 102. The input clip 134 can be any type of part, as can the resulting output. In other words, a single frame can be used to generate multiple frames, a frame portion or layer can be used to generate a full frame, clip, etc.

Flowgraph 116 illustrates the case where the output of a flowgraph, namely flowgraph 116, is a single frame, frame 106.

Flowgraph 118 illustrates the case where two media sources (e.g., from computer RAM, disk storage, a digital network, optical scanning device, etc.) are used to product clip section 108. Clip 110 represents one of the media sources. The other media source is not shown. The dashed arrow indicates that clip 110 is not associated with flowgraph 118 since clip 110 is not generated by flowgraph 118.

The correspondence, or association, of data items between image space and flowgraph space can be by any means as is known in the art. Parts can be stored or represented in any image format. The flowgraphs can be stored or represented as any type of suitable data structure such as a list, relational database elements, etc. The association between images and flowgraphs can be made with pointers, lists, embedding a part with an associated flowgraph in a file, or by any suitable programming or data processing technique.

Figure 1C:
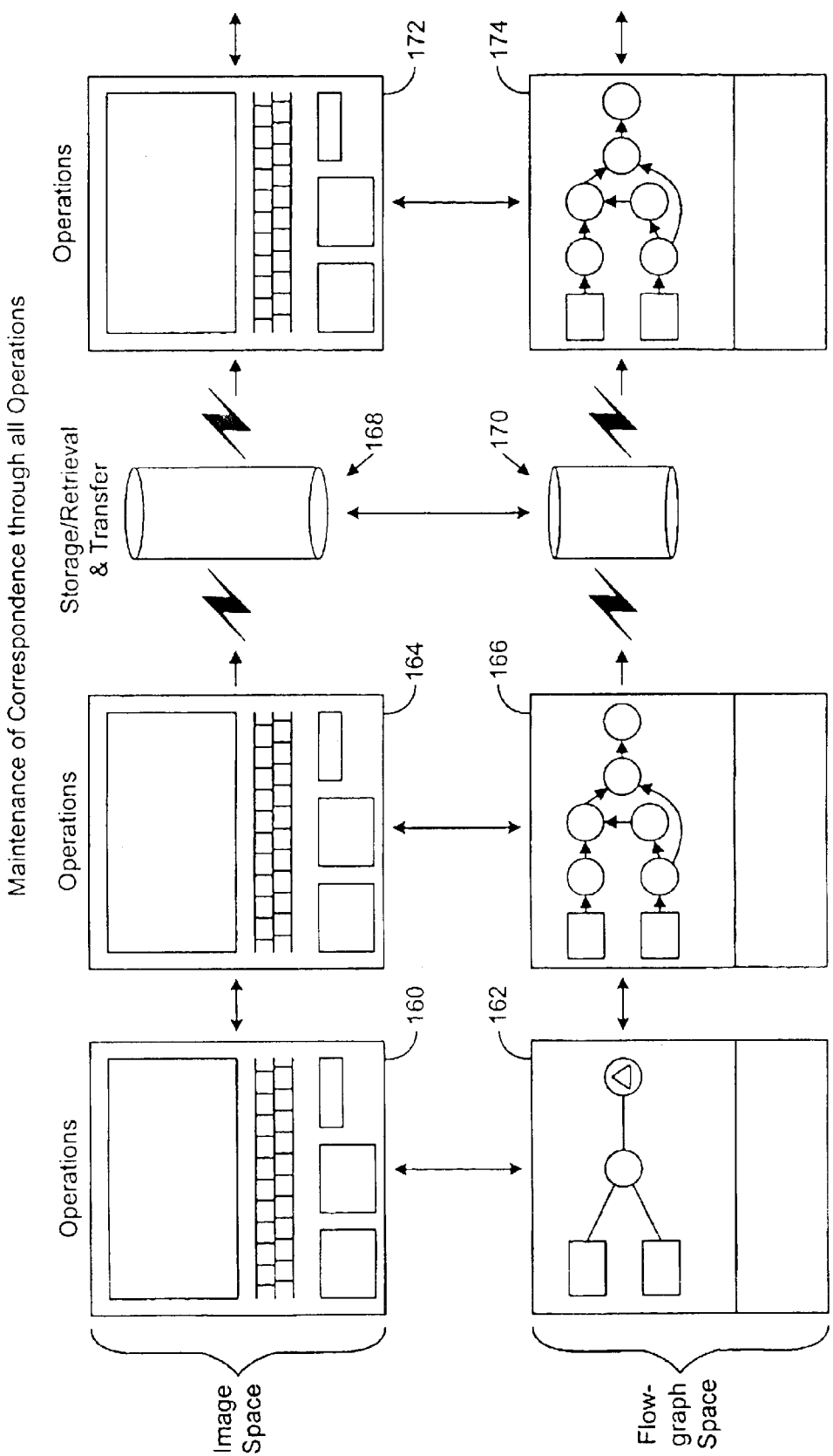
FIG. 1C illustrates the maintenance of correspondence between parts and flowgraphs.

FIG. 1C illustrates the maintenance of correspondence between parts and flowgraphs during any and all types of operations performed in the production system of a preferred embodiment. In a preferred embodiment, there is always a flowgraph counterpart to every production part. Other embodiments need not maintain such a strict rule. However, the insurance of a flowgraph for each part means that a user can easily and instantly switch between viewing and manipulating media in the image space and editing the media in flowgraph space. This achieves a unification of visual presentation of the media with visual presentation of operations used to create the media. As is discussed below, this approach (in concert with other features) provides many benefits.

FIG. 1C shows user interfaces used to perform manipulations to parts in image space. For example, image interface 160 can be used to change the color of an image. The user can then switch to an interface in flowgraph space, represented by flowgraph interface 162, to visually work with the operations. The color change operation is automatically inserted into the flowgraph so that the flowgraph-to-image correspondence is maintained. In a preferred embodiment, every operation that changes a part results in corresponding modifications to the flowgraph associated with the part so that each part always has an up-to-date flowgraph that visually shows the operations used to create or derive the image.

In the course of a typical production, many operations can be made to a part both in image space and in flowgraph space. This is illustrated in FIG. 1C by additional image interface 164 and additional flowgraph interface 166. In the preferred embodiment the user is provided with controls to easily switch back and forth between interfaces in the two spaces.

All types of operations are paralleled. Storage/retrieval and transfer operations are symbolized at 168 and 170. When a part or flowgraph is stored, the associated flowgraph or part, respectively, is also stored in association so another session, program, process, etc., can retrieve the part-flowgraph pair. Note that the two types of representation need not be stored in the same logical or physical area or device. Also, portions of each representation can reside at different location, on different devices, etc., as desired. Similar to storage, when a part or flowgraph is transferred (e.g., over a network to a remote system), the counterpart representation is also made available to the destination.

Retrieval and transfer of a representation pair is illustrated by interfaces 172 and 156.

Thus, the maintenance of closely-linked and continuously updated image and flowgraph pair representations provides advantages in a production system.

Figure 2A:
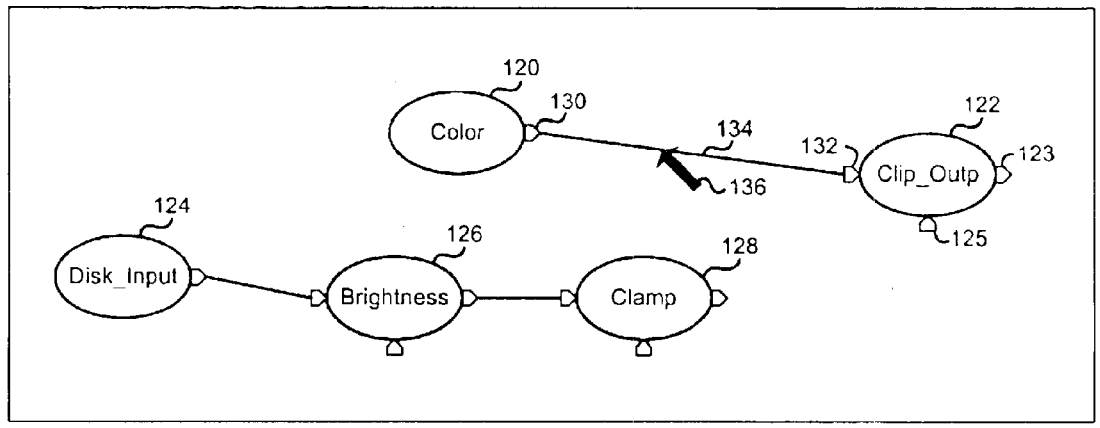
FIG. 2A shows an example of a flowgraph according to the present invention.

FIG. 2A shows an example of a flowgraph, or diagram, according to the present invention.

In FIG. 2A, nodes such as 120, 122, 124, 126 and 128 represent operations. Operations can be effects, filters, processes, actions or any type of action performed on, or with, media content being produced. A list of representative operations is shown in Table I. It should be apparent that many additional types of operations are suitable for use with the present invention.

TABLE I

| | |
|---|---|
| 1. Brightness Adjustment | control of luminance in RGB and Alpha channels. |
| 2. Clamp Effect | restricts pixel values within determined ranges. |
| 3. Contrast | adjusts the range between brightest and darkest tones. |
| 4. Convert | change pixel types between, e.g., 8 bit, 16 bit floating and working. Can also change image types between RGB, RGBA and Alpha channel outputs. |
| 5. Crop | allows trimming an image on the left, right, top or bottom. |
| 6. Dissolve | produces an image that is a mixture of input images. |
| 7. Fade | produces an image that is a mixture of an input image and a solid color. |
| 8. Gain | adjusts the brightness of individual channels of a image or clip. |
| 9. Gamma | adjusts the apparent brightness by altering the middle range of brightness. |
| 10. Invert | reverses an image's color and shades so that black becomes white, white becomes black, red becomes cyan, etc. |
| 11. CMY Graph | adjusts the Cyan, Magenta and Yellow channels. |
| 12. Luma Graph | adjusts the luminance of an image. |
| 13. Monochrome | converts a color image into a monochrome image by adjusting color saturation in each of the color channels. |
| 14. Offset | adjusts the brightness of the individual channels of an image. |
| 15. Swap RGBA | shifts any color channel to become any other color channel. |

Nodes have names that provide brief descriptions, or identifications, of the type of operation represented by the node. For example, node 120 has a name, "Color," indicating that the node is a source for a predefined color output. Output port 130 is an output port for node 120. Connector 134 connects the output of node 120 to node 122 by connecting to node 122's input port 132. Node 122 is called "Clip_Output" which indicates the output of the flowgraph operations. In other words, the flowgraph output is generated at "Clip_Output."

Other nodes shown in FIG. 2A are "Disk_Input" node 124, "Brightness" node 126 and "Clamp" node 128. These three nodes are connected to perform a series of operations to obtain an image input stored on a disk, adjust the brightness of the image and to perform a clamping operation on the image (after the brightness adjustment). Additional details of nodes and other flowgraph properties can be found in the related applications, cited above.

Nodes can have inputs or outputs, called ports, that are not used. For example, node 122 includes output port 123 and mask port 125. The existence of the nodes, even though they are not connected to another node, indicates that the signal (i.e., input, output or mask) is available and gives the user additional information about the node. A node without an input port is a source of media content such as an image, clip, section, layer, or other production part. A node without an output port is an endpoint for one or more operations and typically results in displaying the content as, for example, a clip clip output node or data storage node (not shown). The mask port is used as an input for an optional grey-scale image. The grey-scale image defines to which pixels an effect (or other operation) is applied. Typically, if the grey-scale image pixel is white then the effect is applied fully. If black then the effect is not applied. If grey then the effect is applied proportionately. This is also referred to as an "obey" matte and/or "control image." The absence of an input to a mask port means that the node's operation will be applied to the entire frame.

In FIG. 2A, pointer 136 is used to manipulate elements of a flowgraph to achieve a desired result on a production part. The present invention provides features for efficiently configuring flowgraphs with simple pointer manipulations. The pointer is preferably manipulated with a graphics tablet or mouse. However, any type of user input device can be used such as a touchscreen, light pen, trackball, trackpoint, vision tracking device, etc.

In FIG. 2A, pointer 136 is used to select and drag an end of connector 134. In a preferred embodiment, a connector is selected by moving the pointer onto, or within a predefined proximity of, the connector and then activating a selector such as a tablet button or pen press, mouse button, etc. When the pointer is in proximity to a connector the connector becomes highlighted, or displayed at a brighter intensity. Any manner of indicating proximity is possible such as changing the color of the connector, flashing the connector, etc. Once selected, an endpoint of the connector can then be dragged away from a port. In the preferred embodiment, whichever endpoint of the connector is closest to the pointer when the connector is selected is the endpoint that is decoupled from the attached port. In FIG. 2A, the endpoint at port 130 is decoupled.

Figure 2B:
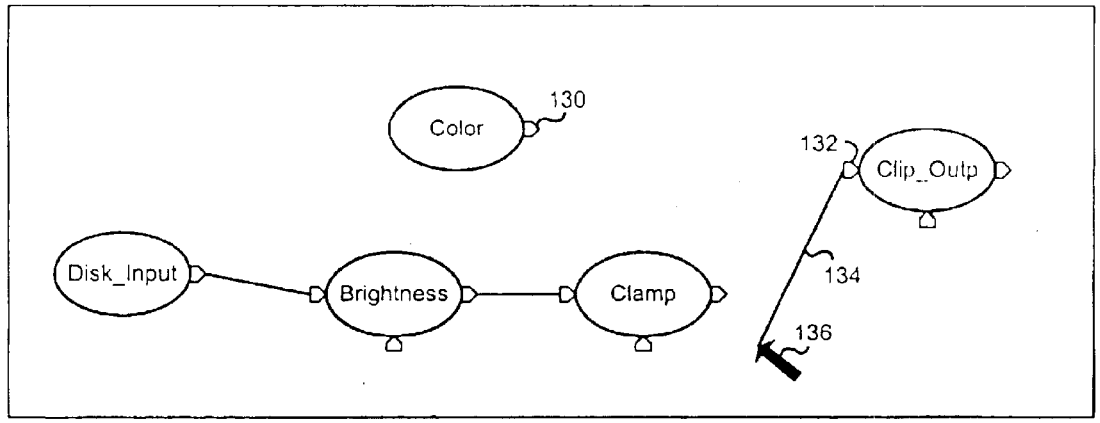
FIG. 2B shows the flowgraph of FIG. 2A just after a connector has been selected and moved.

FIG. 2B shows the flowgraph of FIG. 2A just after connector 134 has been selected and moved. In general, items with the same reference number in different Figures represent the same item.

In FIG. 2B, connector 134's free endpoint is now at the tip of pointer 136. Just after an endpoint is decoupled, the endpoint is made to follow the tip of the pointer. This allows the user to easily position the free endpoint at a new port. The connector remains coupled to port 132 throughout the process of re-coupling the free endpoint. This causes the connector to pivot about port 132. The connector can also shrink and grow, as necessary, to maintain its free endpoint at the tip of pointer 136.

Figure 2C:
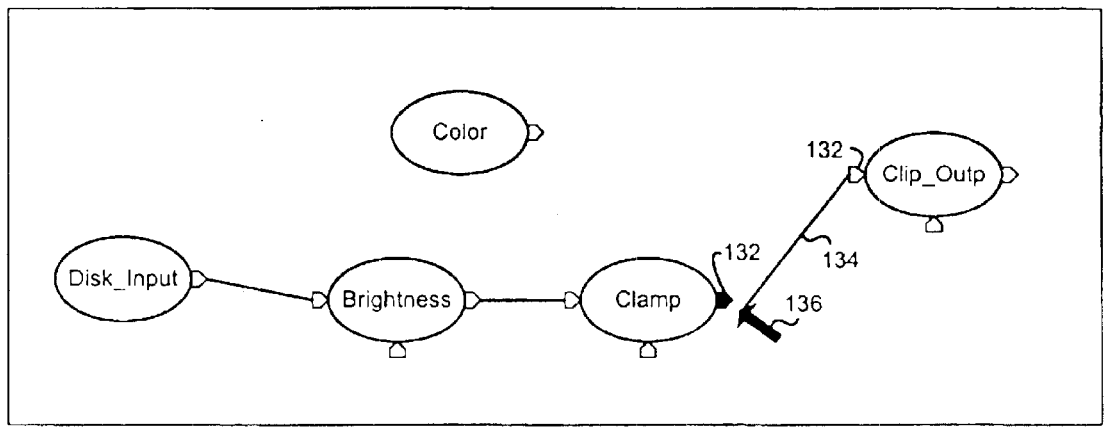
FIG. 2C shows a pointer and free endpoint in proximity to a port.

FIG. 2C shows the pointer and free endpoint in proximity to port 138.

In FIG. 2C, port 138 has been highlighted. When a port is highlighted, the connector's free endpoint will be joined to the point if the user releases the connector. The user can release the connector by, e.g., using a button, making a pen/tablet selection or movement, etc. A preferred embodiment of the invention uses a "picking area" to determine when a connector's free endpoint is close enough to a port (or other item) so that the port becomes highlighted and becomes the target for the free endpoint upon release. The picking area always at least includes the item area. In other embodiments, the picking area can be adjusted, e.g., depending on zoom factor, number of items on the display to prevent picking area overlap, by user selection, etc. The picking area can potentially be any shape and can be different shapes for different items. The picking area can be dynamically altered by the production system software so that, for example, when there are not many ports on the screen, the picking area is larger for each port.

Another factor that the preferred embodiment uses to determine whether to highlight a port is whether the resulting new connection would make sense. For example, in FIG. 2C, port 140 would not become highlighted no matter how close the free endpoint was brought to the port. This is because port 140 is an input port and a connection to it would result in input port 140 being coupled to input port 132.

Figure 2D:
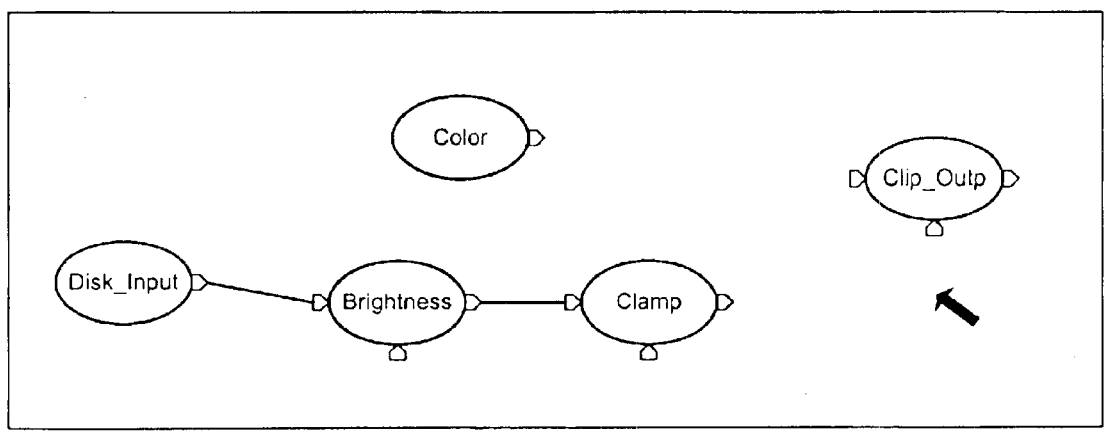
FIG. 2D illustrates the case where a connector's free endpoint is released not in proximity to a highlighted port.

FIG. 2D illustrates the case where a connector's free endpoint is released not in proximity to a highlighted port. In such a case, the connector is deleted from the display.

A connector can be created by depressing a selector while a port is highlighted.

Figure 3A:
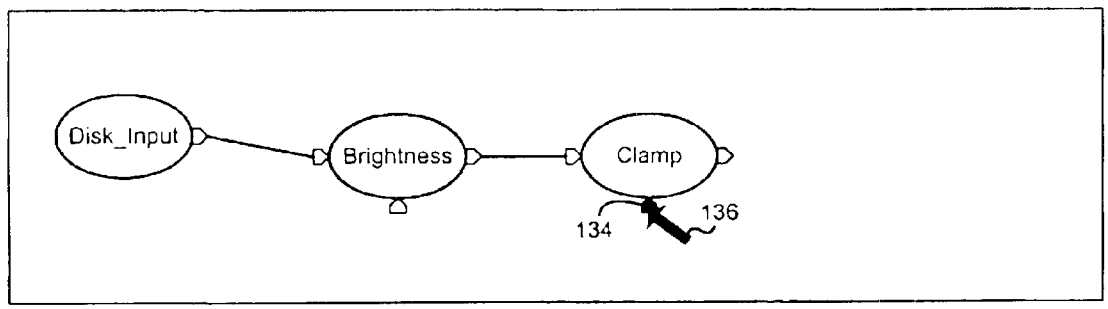
FIG. 3A illustrates a pointer in proximity to a highlighted port.

FIG. 3A illustrates the pointer in proximity to port 150 so that port 150 is highlighted. Activating a selector causes a connector to be created with one endpoint coupled to port 150 and the other, free, endpoint will track pointer 136 until it is attached as described, above.

Figure 3B:
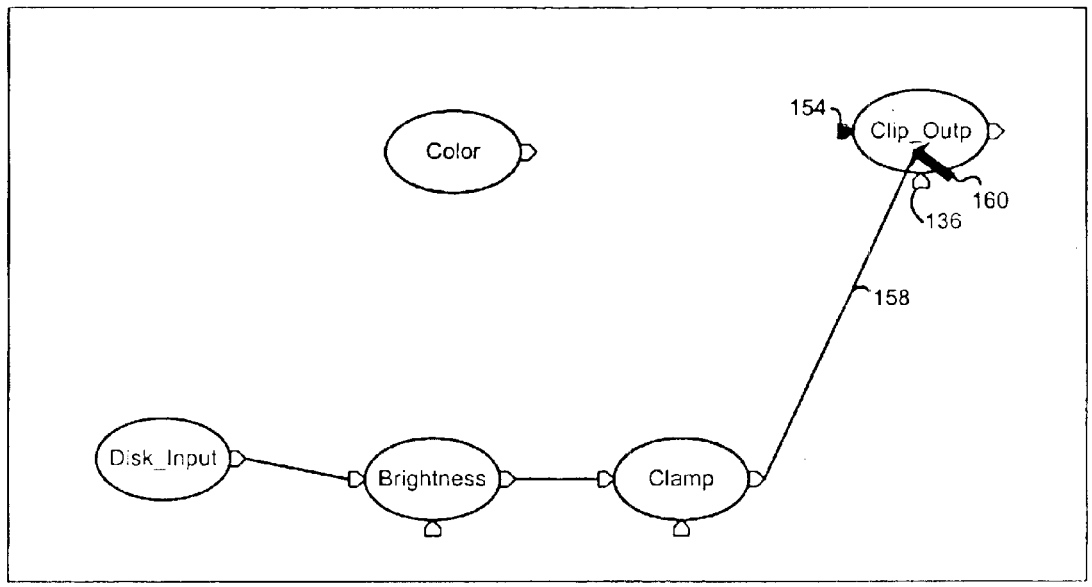
FIG. 3B illustrates highlighting of a default connection point.

FIG. 3B illustrates a feature of the invention where, when the pointer is moved over a node, a default connection point for any currently selected connector is highlighted regardless of the proximity of the pointer to the node's ports. In FIG. 3B, port 152 is a more appropriate port than port 156 for coupling to connector 158's free endpoint. Thus, even though pointer 160 is closer to port 156, the system chooses port 154 to highlight.

Figure 3C:
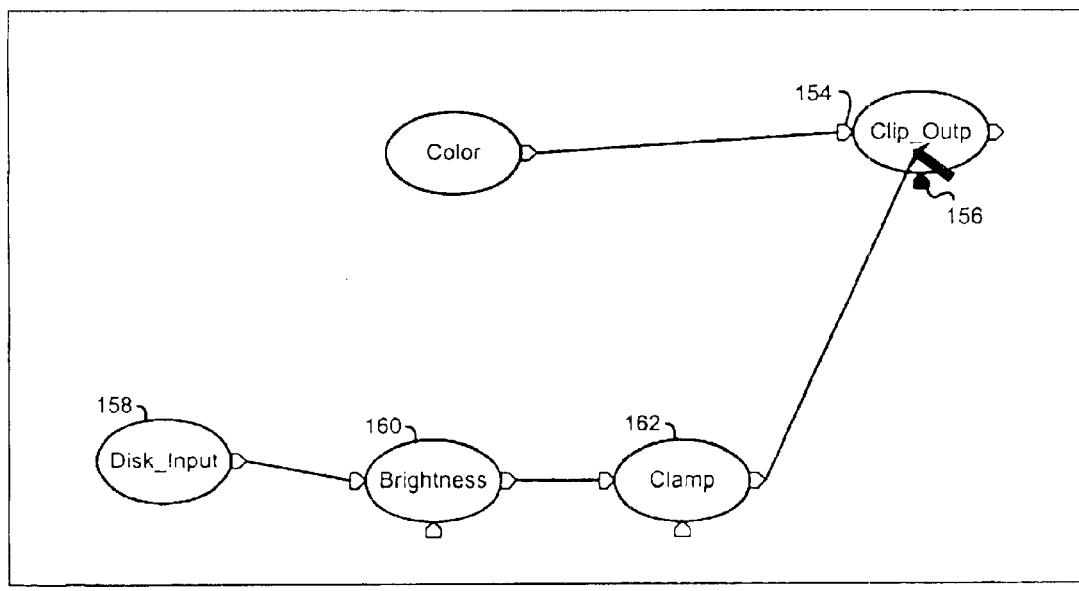
FIG. 3C illustrates a port highlighting feature of the present invention.

FIG. 3C illustrates another port highlighting feature of the present invention. In FIG. 3C, port 154 is already occupied with a connection. This makes port 156 the likely port for a new connection. Note that many different rules can be employed in automating port highlighting to assist in making connections.

Other features of connection adding and manipulation are provided.

A user can "kiss" a node into another node by dragging a first node so that the first node contacts a second node on the display. This can cause the system to join the two nodes in a most-logical manner. For example, the rules provided, above, for highlighting a port can be used to select connections when nodes are kissed. Another approach is to determine a port on each node that is closest to the point of contact of the nodes at the "kiss," or touch point. The two closest ports are joined, if compatible (e.g., an input and output port). The present invention uses color to advantageously indicate types of ports. For example, input ports are green while output ports are red. Mask ports are blue. Highlighted ports become white while highlighted.

Port colors can be changed permanently or momentarily (e.g., "flashed") when a kissed connection is made and the two connected ports are still too close together to see a line connection. The user is then informed that the kiss action resulted in a connection and can then move the nodes apart, as desired. Audio can also be used to indicate that a kiss connection was accomplished.

Nodes can be "shaken" free from connections to other nodes. This is accomplished by grabbing the node (i.e., with the pointer and selector button) and shaking the node rapidly from side-to-side, up-and-down, etc. When a predetermined speed, number of oscillations, etc., is reached the node is removed from any or all connections. For example, in FIG. 3C, if the user were to grab and shake node 160, node 160 would break free of its connections with nodes 158 and 162 to leave the output of node 158 coupled to node 162 with a single line connector. Node 160 can remain in the flowgraph area as a detached node still attached to the pointer. Color, animation or audio cues can be used to let the user know that a node has broken free, is about to break free, etc.

A node can be added onto an existing connection between two nodes so that the added node intervenes in the connection. For example, the free node 160 in the above example can be replaced into position by dragging and dropping the node onto the connection between nodes 158 and 162.

A flowgraph is associated with the production part that it produces. A production part can be a frame, frame portion, layer, clip, section (of a clip), scene, file, or any other part of the production. Production parts can be stored on recordable digital media such as magnetic disk or tape, compact disk read-only memory (CDROM), persistent random-access memory (RAM), read-only memory (ROM), etc.

A preferred embodiment of the invention maintains an association of a production part with the flowgraph that generated the part. Whenever the part is stored, the flowgraph is also stored with the part. The flowgraph can be stored integrated with a production part in a single structure (e.g., a file or data structure), or the flowgraph can be stored as a separate storage entity, even on a separate physical device or medium, but indexed to, or associated with (e.g., by a common identifier, via pointers, via a table, etc.) the corresponding production part that the flowgraph generated.

As long as the flowgraph-to-part association is maintained, the flowgraph can be imported whenever the part is accessed. This ensures that the benefits discussed herein, and in the cited related applications, of using a detailed, accurate flowgraph, will always be available to the user.

Figure 4A:
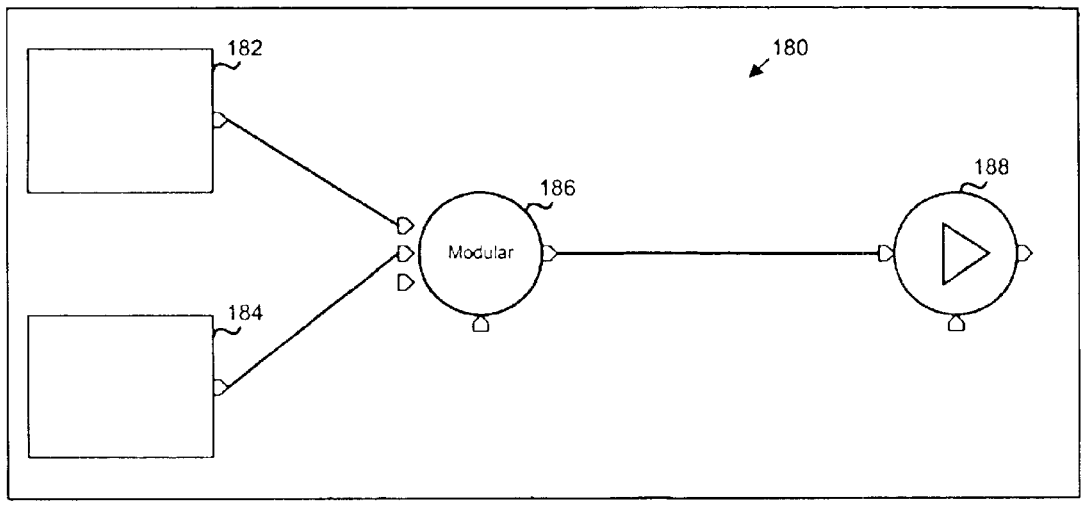
FIG. 4A is a first illustration of automatic flowgraph generation.
Figure 4B:
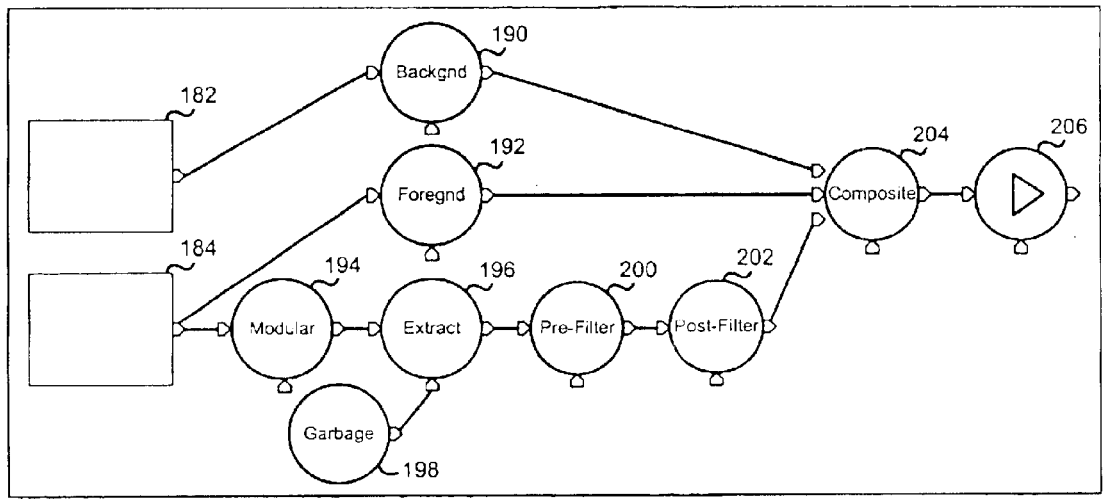
FIG. 4B shows generation of flowgraph nodes corresponding to a modular node.
Figure 4C:
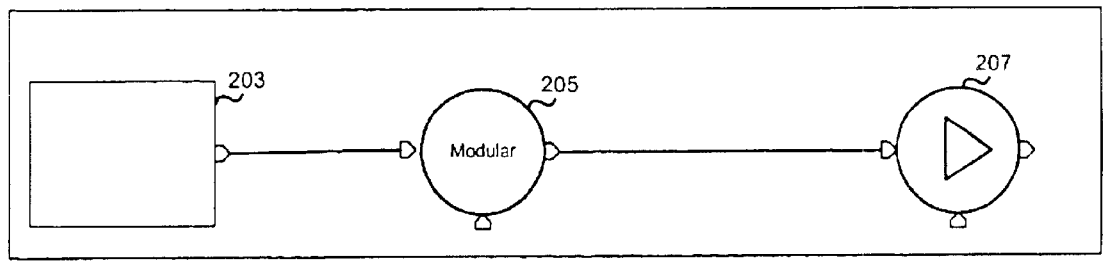
FIG. 4C illustrates modular node expansion for multiple layers.

FIGS. 4A–C illustrate automated flowgraph generation in the present invention.

In FIG. 4A, flowgraph 180 includes the following items, or nodes: images 182 and 184, modular node 186 and clip output node 188. The present invention allows "expansion" of nodes that represent complex, or multi-node, operations. Such a complex operation is represented by modular node 186 which is an operation for compositing image 184 onto image 182. In order for a user to more easily understand and modify a complex operation, the present invention allows the complex operation to be expanded in the flowgraph space so that sub-operations of the complex operation are shown in an expanded flowgraph. The creation of sub-operation nodes is automatic and is referred to as automated flowgraph generation.

FIG. 4B shows the flowgraph of FIG. 4A after automatic generation of flowgraph nodes corresponding to modular node 186 of FIG. 4A.

In FIG. 4B, modular node 186 of FIG. 4A has been replaced with expanded nodes 190, 192, 194, 196, 198, 200 and 202. These expanded nodes represent sub-operations in the complex composite operation represented by modular node 186 of FIG. 4A. For example, Background node 190 represents processing of image 182 (such as color correction, etc.) which is the background for the composite operation. Similarly, Foreground node 192 represents processing of image 184 which is the foreground image to be composited over the background.

Modular node 194 represents a complex operation to be performed on image 184. For example, color correction, contrast adjustment, sharpening, etc., can be performed within modular node 194's operations. This shows that modular, or complex, nodes can exist within other complex nodes. Modular node 194 can be expanded similarly to the expansion of modular node 186 of FIG. 4A. Other sub-operations include garbage mask generation node 198 extract node 196, and pre and post filter nodes 200 and 202, respectively. Sub-nodes can be collapsed back into a single modular node by user selection.

Figure 4D:
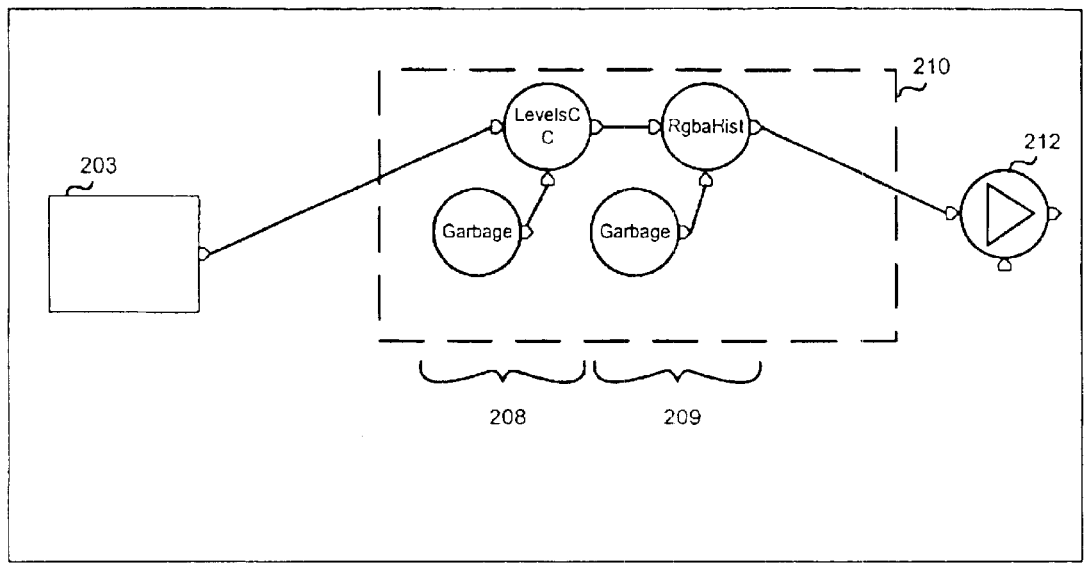
FIG. 4D shows a modular node replaced with multiple nodes for 2 layers of a color correction operation.

FIGS. 4C and 4D illustrate modular node expansion for multiple layers.

In FIG. 4C, modular node 207 represents a multi-layered function where each layer corresponds to an operation to be performed in a different region of the source image 205. Such multi-layered functions are common since different areas of images may require different degrees, or types, of effects or other operations. The automated flowgraph generation feature of the present invention is particularly useful to generate multiple node sets for each layer of processing. For example, a user can decide that two different regions of source image 205 need to be processed in a color correction operation. The user then selects to have nodes generated automatically for 2 different layers in the desired operation.

In FIG. 4D, modular node 207 of FIG. 4C is shown replaced with multiple nodes for 2 layers of a color correction operation. The multiple replacement nodes are generated by the production system and are shown in FIG. 4D within box 210. The nodes are in two sets. A first set is at 208 an includes a garbage mask node as input to a level color correction node. A second set is at 209 and includes a second garbage mask node as input to an RGB modification node. Each set of nodes handles processing of a different layer, or region, of image 203, as defined by the respective garbage masks. Different layers can perform the same, or a different, function to a region of the image. If more layers were chosen by the user then more sets of expansion nodes would be generated, similar to the sets 208 and 209.

Figure 4E:
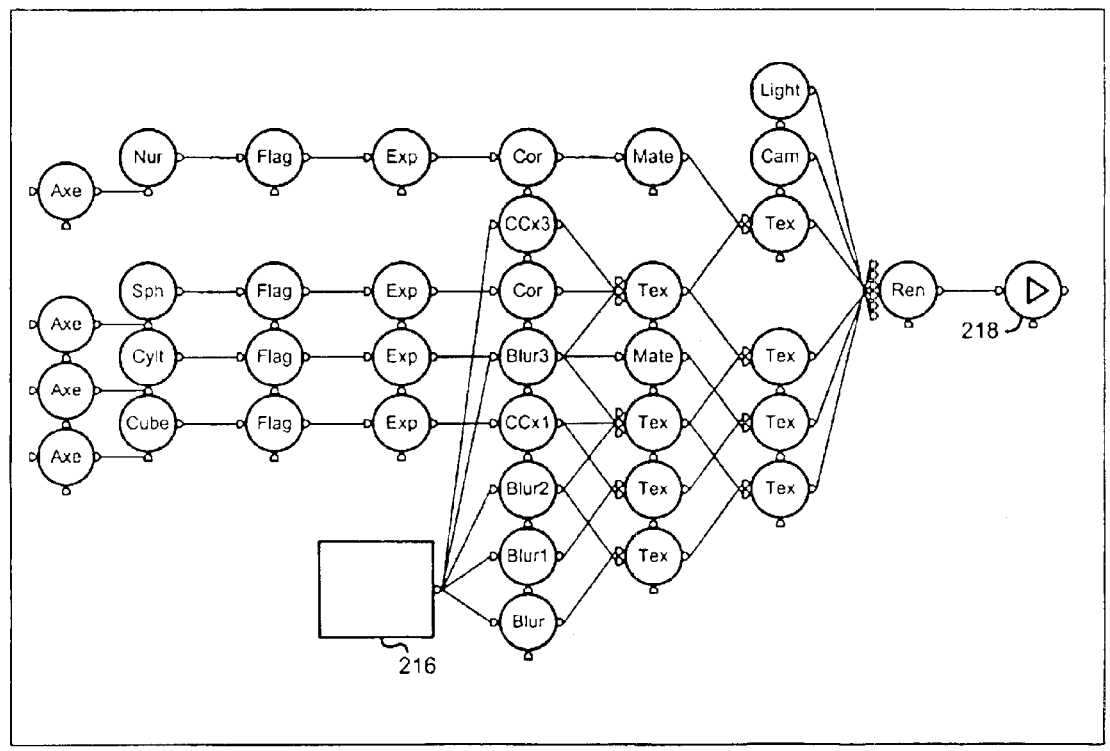
FIG. 4E illustrates expansion for an even more complex node, or operation.

FIG. 4E illustrates expansion for an even more complex node, or operation.

In FIG. 4E, all nodes other than image 216 and clip output node 218 are automatically generated when the user directs the production system to expand a "True3D" node. The expansion shows sub-operations of a complex operation to create a 3D model for texture mapping. Note that all, or a portion, of the nodes in FIG. 4E can be generated automatically in response to a user request to expand a complex node. In general, any number of nodes, including additional complex nodes, can be automatically generated. Generation can be by any means, such as using pre-stored lists of nodes, accepting values from the user to help define the generation (e.g., a number of layers to generate), using a formula or algorithm, etc.

One way of controlling parameter adjustment is to allow freehand line drawing with a device such as a graphics tablet, mouse, touchscreen, etc. A user can draw arbitrarily with the input device either while a clip is playing or in the absence of playback. The line can then be used to adjust the parameter.

Figure 5:
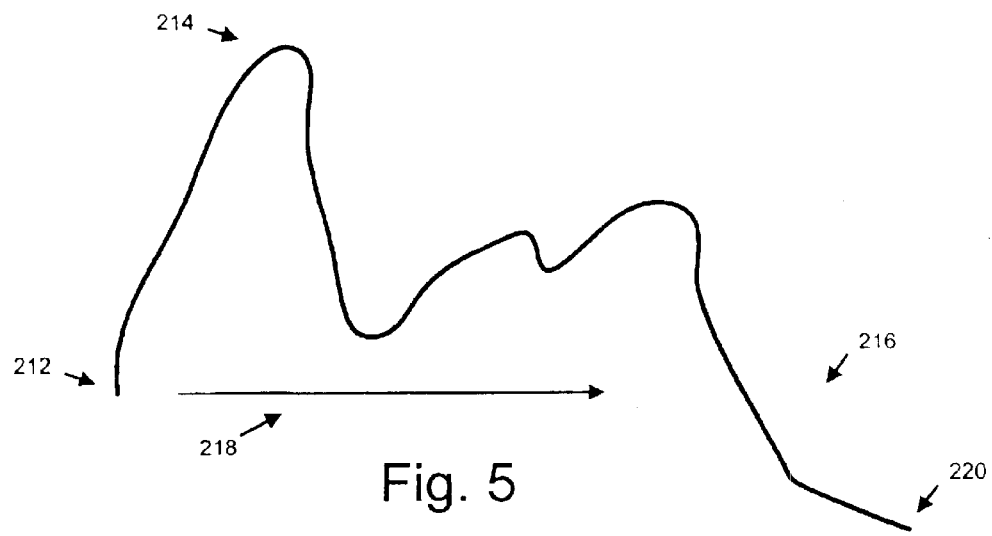
FIG. 5 illustrates a line obtained from a freehand drawing to control a parameter.

For example, FIG. 5 illustrates line 210 obtained from a user's drawing to control a brightness parameter. The higher up the line goes from origin point 212, the greater the brightness parameter. For example, peak 214 represents the brightest value for the parameter, and the image or clip being controlled. The decline at 216 represents a fading of the brightness that extends to below the origin point so that the brightness falls below the original level. Similar effects exist in the middle of the drawn line where as the line goes up the brightness parameter value is increased and as the line goes down the value is decreased.

Note that this technique can be applied both in space and time. For example, where a clip is played back, horizontal axis 218 (not part of the drawing) represents changes to the parameter value with respect to time. For example, as the clip playback proceeds, successive frames in the clip are affected in brightness according to the line drawing from left to right. Origin 210 and endpoint 220 correspond to the start and stop, respectively, of the clip playback. Alternatively, the drawing can correspond to position in an image. In this case, horizontal axis 218 represents a left-to-right point in the image and portions of the image are affected in brightness according to the drawing. The origin and endpoint correspond to left and right edges of the drawing, respectively.

A drawing can be made to correspond to areas of an image, to the playback of a clip, layers of an image, masks, effects, etc. A line drawing can be vertical (e.g., top-to-bottom). In some input devices, such as a tablet, additional control can be obtained by how hard a user is pressing onto a writing surface. Speed of writing can also be sensed. These additional signals can be used to control additional parameter values concurrently with control of a first parameter value.

Once a drawing has been obtained it can be stored and re-used. It can also be applied to other parts of a production, such as other frames and clips, to adjust parameters or characteristics of the production part. Drawings can be obtained in the abstract devoid of a connection to a specific image or clip. In other words, a drawing generated without a connection to an image or clip can later be used to modify the image or clip. Multiple different parameters can be controlled with the same drawing.

Figure 6:
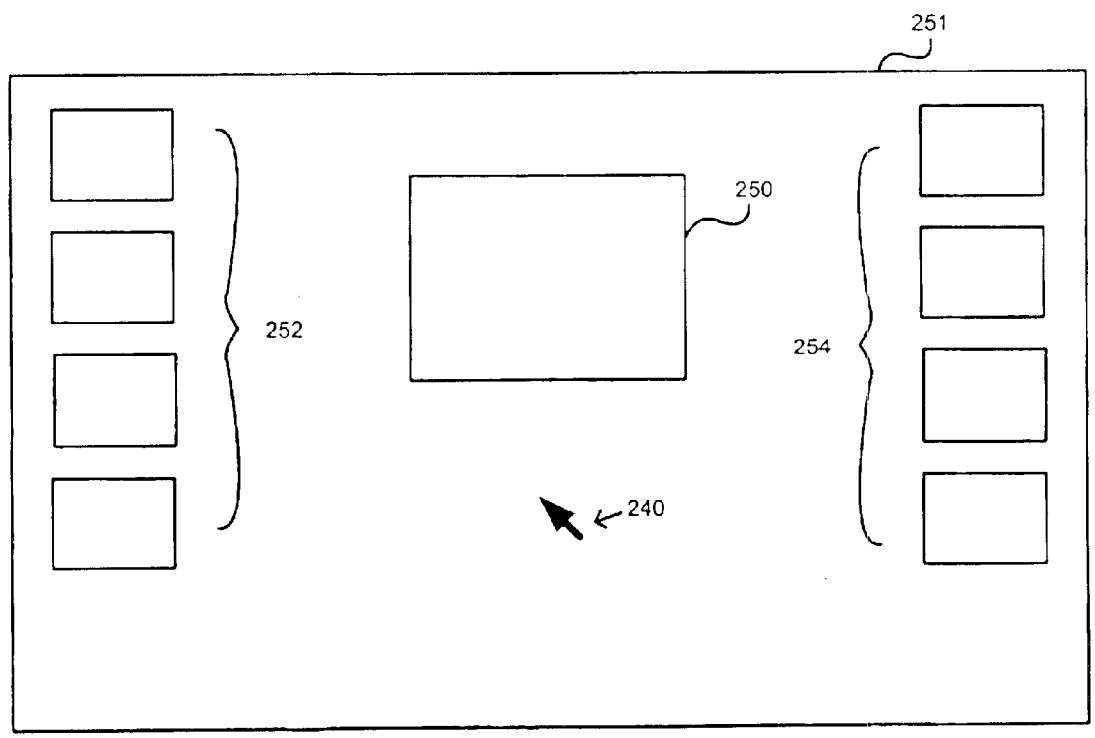
FIG. 6 illustrates the "monitor swatch" feature of the present invention.

FIG. 6 illustrates the "monitor swatch" feature of the present invention.

In FIG. 6, main image 250 on screen display 251 can undergo many changes while a user performs operations to achieve a desired image. Many times the user is doing trial-and-error modifications. At any point during the changes, the user can select to capture the image to an image set to the left or right side of the screen display. The captured images are referred to as "swatches." As shown in FIG. 6, the captured image is reduced in size and remains displayed on the screen in areas 252 or 254. This allows the user to visually compare different phases of an operation.

A user can revert back to the settings in a captured image by dragging and dropping a swatch into the main image. Various bookkeeping functions are supported. For example, specific swatches can be "locked" so that they are not overwritten by other swatches until unlocked. Various editing functions can be provided to delete, move, etc., the swatches. The swatches can be named and saved in a manner similar to saving other parts of the production. The swatches can be compared simultaneously at fall resolution to whatever image, or image change, also is taking place on the screen in the main area in the middle of the display.

Figure 7A:
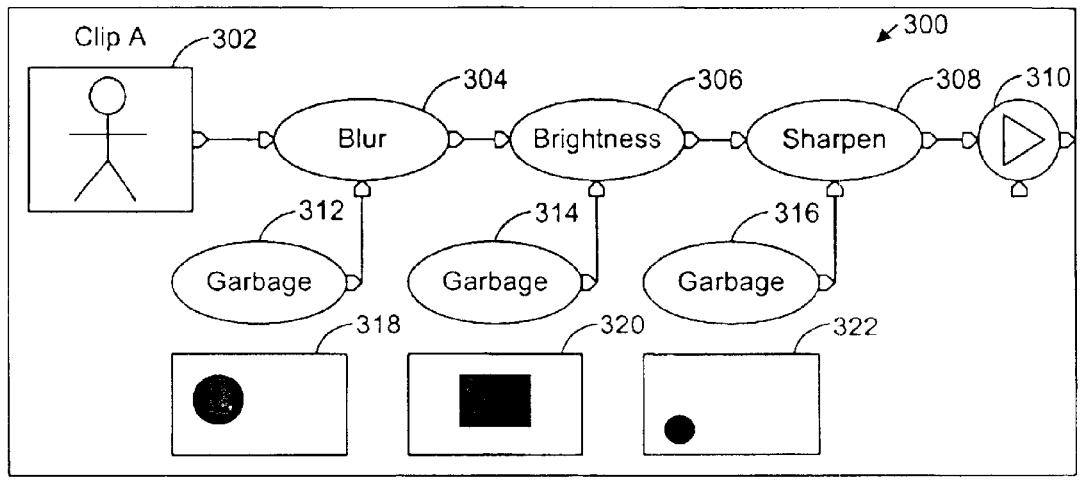
FIG. 7A shows a flowgraph to illustrate the "pixel query select" feature of the present invention.

FIG. 7A shows flowgraph 300 used to illustrate the "pixel query select" feature of the present invention. In FIG. 7A, clip 302 ("Clip A") is processed by the series of operations by Blur node 304, Brightness node 306 and Sharpen node 308. Each of these operations is applied to a region of Clip A according to a garbage mask that is input from nodes 312, 314 and 316, respectively. Node 310 is used to indicate that the resulting output can be played back.

A bitmap image of each garbage mask is shown in FIG. 7A. Although such masks are not typically part of the flowgraph display, they are shown in FIG. 7A for ease of discussion. Mask 318 is the input to Blur node 304, mask 320 is the input to Brightness node 306 and mask 322 is the input to Sharpen node 308. A user can select to view the image at any of the nodes by selecting the node. For example, if the user selects to view the results of Blur node 304's operation the user would view Clip A (or a frame of Clip A) after the blur effect is applied but before the brightness and sharpen effects are applied. If the user views the output of Sharpen node 308 then all three of the operations' effects are viewed.

Figure 7B:
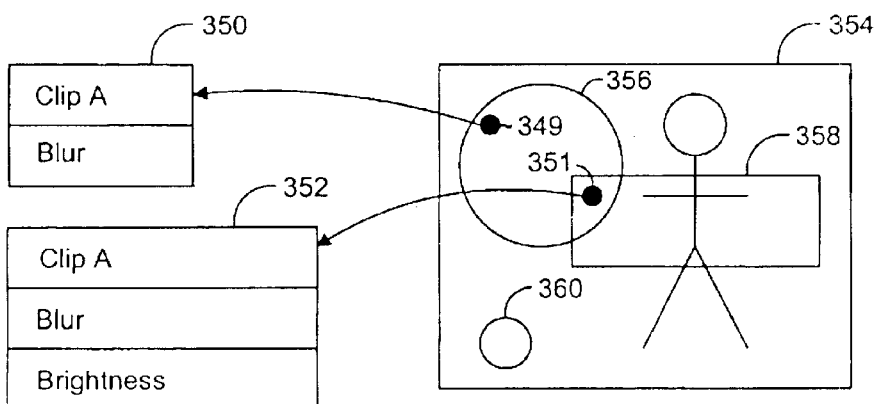
FIG. 7B illustrates the "pixel query select" feature when viewing the result of a node's output.

FIG. 7B illustrates the "pixel query select" feature when viewing the result of Sharpen node 308's output. The pixel query select feature is useful for reporting on effects, filters, and other operations that have been performed on a picture element ("pixel"). It also allows a user to more quickly determine which effects, or operations, are having noticeable effects on an image in general, or on a pixel in particular. This is useful, for example, to determine effects that are causing errors, or unwanted anomalies or artifacts in the image processing.

In FIG. 7B, image 354 illustrates one frame of Clip A as viewed at Sharpen node 308. This view is also the same as would be shown at node 310 since Sharpen node 308 is the last node before the clip output node. In FIG. 7B, the stick figure represents content in the frame. Regions 356, 358 and 360 correspond to masks 318, 320 and 322, respectively. In other words, the blur operation is applied only in region 356, the brightness operation is applied only in region 358 and the sharpen operation is applied only in region 360. These regions are not shown in the preferred embodiment, although other embodiments could make them visible. Rather the regions indicate which portions of the image have been subjected to the corresponding operation.

As the user moves a pointer (not shown) over the image, a pop-up menu appears on the screen to indicate the types of effects that have been applied to the specific pixel, or other small area, that is pointed to by the pointer. For example, if the pointer is pointing to pixel 349 in region 356, a list such as 350 appears to show that pixel 349 is affected by Clip A (the original content) and the blur effect supplied by Blur node 304. Similarly, if the pointer is pointing to pixel 351 that is in both retion 356 and 358, list 352 appears which shows that pixel 351 is the result of Clip A, the blur operation from Blur node 304 and the brightness operation from Brightness node 306.

In a preferred embodiment, the operations that are shown by the pixel query select lists can be masked. The user moves the pointer through the list of operations and the operation under the pointer is "turned off" so that the effect of the operation on the pixel, or overall image, can be immediately viewed. Since the operations shown in the list are all of the operations used to create the pixel, the user is provided with a convenient way to determine which operation may be causing a problem. Other options are possible. For example, all operations can be turned off and then a pointed-to operation can be turned on. The user can create additional filters for the listed operations in order to reduce the number of operations in the popup list when there are many operations. For example, the user may select to list just rendering operations.

Figure 7C:
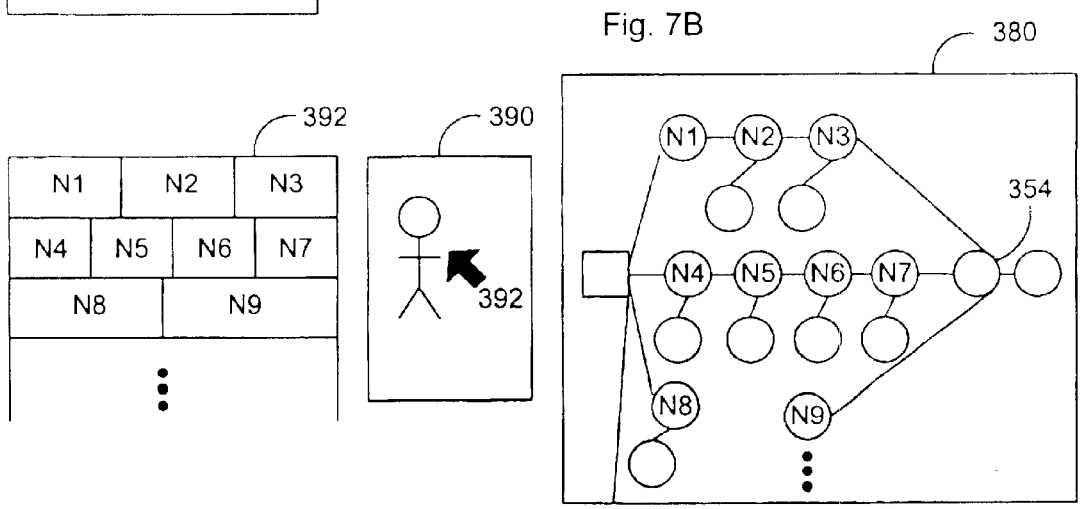
FIG. 7C illustrates display of operations in a pixel query select list.

FIG. 7C illustrates display of operations in a pixel query select list.

In FIG. 7C, flowgraph 380 has several operations labeled as N1-9. Assuming the user is viewing image 390 at node 394 so that all of nodes N1-9 effects are present, and assuming that pointer 392 is over a pixel that is within the mask, or region, of all of the effects, a list arranged as shown for list 392 would appear.

List 392 is organized following the layout of the flowgraph. Each row of list 392 corresponds to a row of the flowgraph. For example, row 382 of list 392 corresponds to the flowgraph row containing nodes N1, N2 and N3. Similarly, row 384 of list 392 corresponds to the flowgraph row containing nodes N4, N5, N6 and N7. Row 386 corresponds to the flowgraph row containing N8 and N9. In an actual list display, each node has a descriptive name and each name (or part of a name) is used to identify the node rather than the labels in the present example of N1-9.

The layout of list 392 helps the user to correlate node names in the list with nodes in flowgraph 380. Further, other organizational features of flowgraph display are carried over to the node list display. For example, since layers in the flowgraph typically appear on different rows, layers of operations in the list will also be on different rows.

Figure 8B:
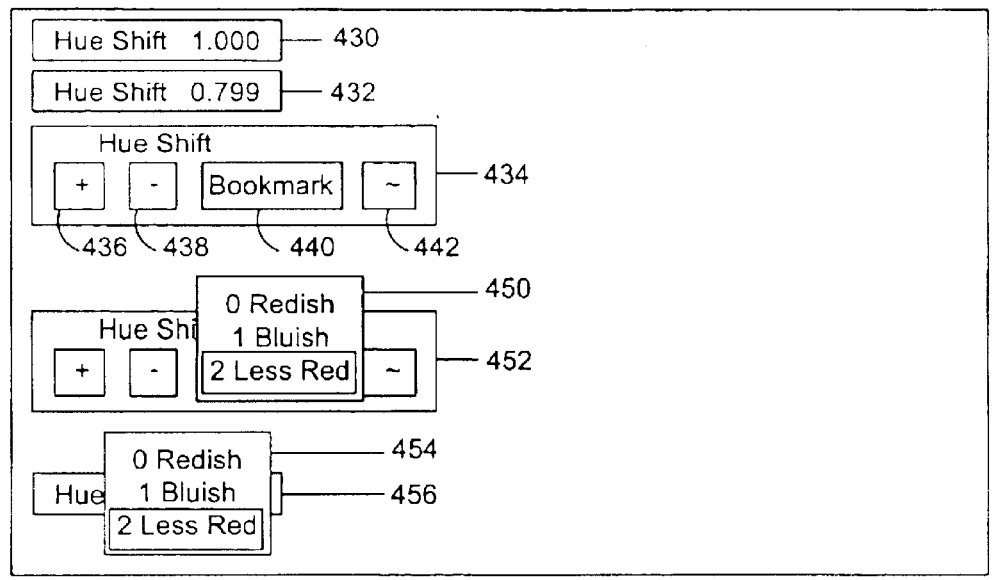
FIG. 8B illustrates the use of bookmarks on a typical input box.
Figure 8A:
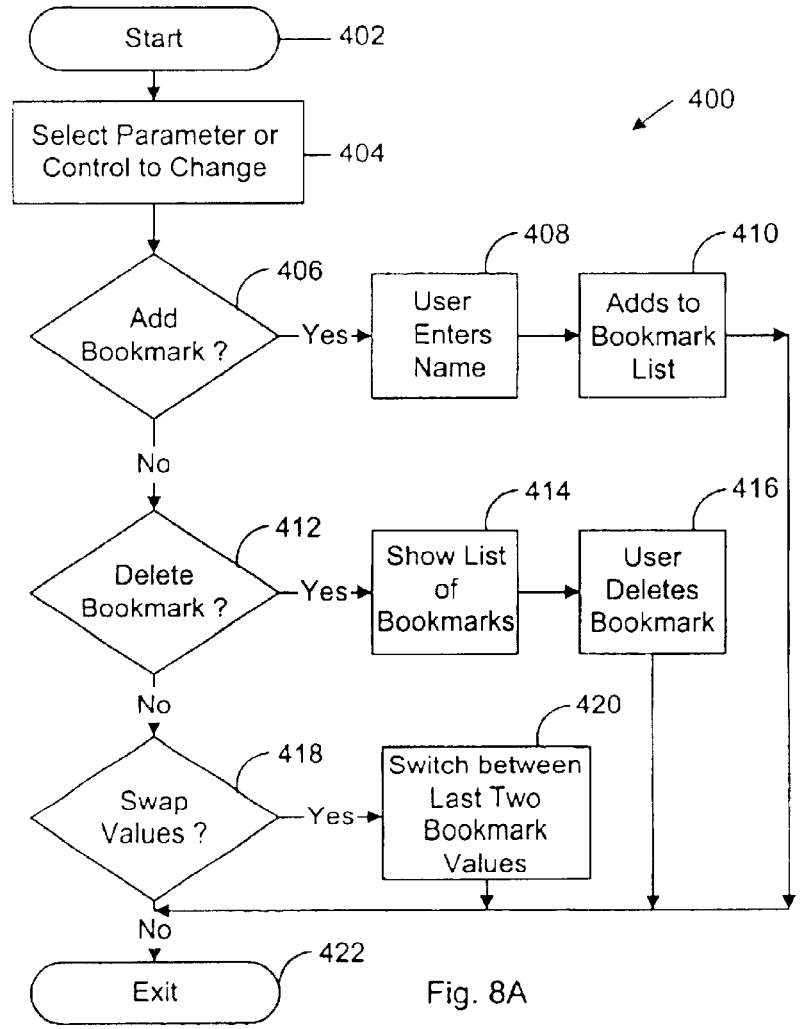
FIG. 8A shows flowchart for a routine to handle the creation and management of bookmarks.
Figure 8C:
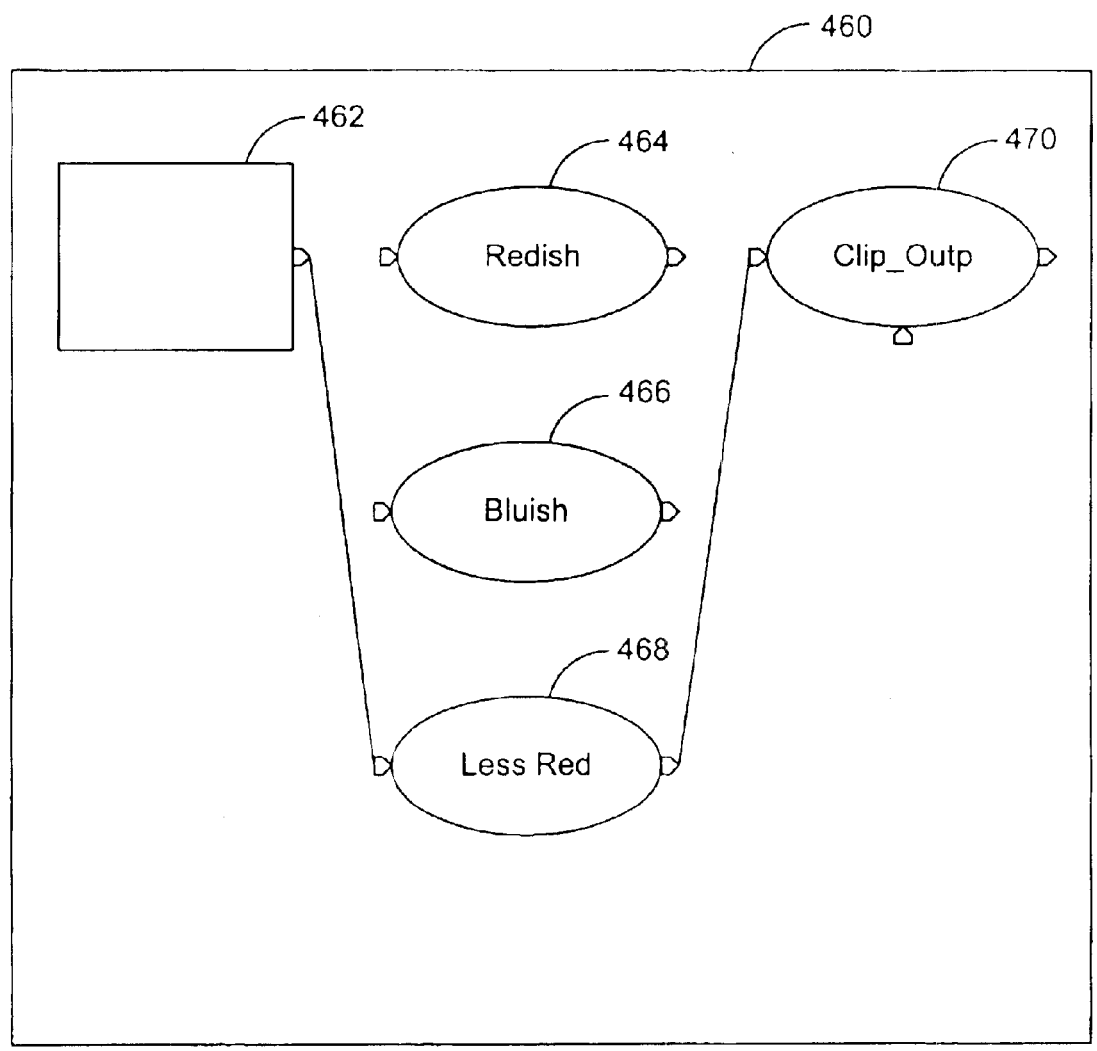
FIG. 8C illustrates the feature of converting a bookmark list to a flowgraph.

FIGS. 8A–C illustrate a bookmark feature of the present invention and the ability to convert from bookmarks to flowgraphs.

Bookmarks provide a way for a user to label and save any type of parameter or control setting, or groups of settings, provided by the user interface of the production system. For example, if a user opens a dialog box with several parameters for, e.g., hue, saturation and value; the user can point to the input box, control, etc., for any of the parameters, enter a value and create a bookmark for the value corresponding to the parameter. At a later time, the user can call up the created list of bookmarks for the parameter and select one of the predefined values. The bookmark feature is provided for virtually all parameter settings, control actions and other inputs. This allows the user to use recognizable labels for settings rather than numerical values or control positions. Also, as shown below, the user can organize and manage bookmarks, and convert bookmarks to flowgraph nodes.

FIG. 8A shows flowchart 400 for a routine to handle the creation and management of bookmarks.

In FIG. 8A, the routine is entered at step 402 when the user has invoked the bookmark feature as, for example, by depressing a hotkey while the pointer is over an input box, control, or other screen input item. At step 406 a check is made as to whether the user desires to add a bookmark. As is discussed, below, invoking the bookmark feature causes a small control panel to appear to let the user add a bookmark, delete bookmarks or to swap between bookmark settings.

If the user has chosen to add a bookmark, execution proceeds to step 408 where the user enters a name for the bookmark. Next, step 410 is executed to add the bookmark to a list and the routine exits at step 422.

If the user has chosen to delete bookmarks, instead, this is determined at step 412 and step 414 is executed to show a list of bookmarks. Step 416 allows the user to delete bookmarks from the list. The routine exits at step 422.

If the user has chosen to swap values then step 420 is executed to switch between the last two bookmark values. In other words, if no bookmark value has been selected for the current (i.e., the pointed-to) control, then the value of the last bookmark used for the control is entered. If a bookmark value is presently assigned to the control then the value of a prior bookmark value used for the control is swapped for the current value. The routine exits at step 422.

FIG. 8B illustrates the use of bookmarks on a typical input box. As mentioned, any type of parameter or control input can be the subject of a bookmark. For example, visual knobs, sliders, moveable curves, alphanumeric character input boxes, etc., can all be bookmarked. Where a dialog box, input panel, or other user interface input mechanism requires multiple inputs, all of the inputs can be treated as a single bookmark.

In FIG. 8B, input box 430 is designed to accept a "Hue Shift" value. When the user selects the hue input box, a default value of 1.000 appears. Next, the user types a number on the keyboard to supply a new value entry of "0.799" as shown in box 432. Next the user selects to create a bookmark for the new value. The user depresses a hotkey (or selects the bookmark feature by any other means) and hue shift bookmark box 434 appears.

Hue shift bookmark box 434 includes add bookmark button 436, delete bookmarks button 438, select a bookmark button 440 and swap bookmark values button 442. At this point the user selects add bookmark button 436. The user is then prompted for a name for the bookmark. The user uses the keyboard to enter the name "Less Red".

Bookmark list 450 shows the list of bookmarks for the "Hue Shift" parameter after the user has entered a new bookmark, "Less Red". Bookmark list 450 shows previously defined bookmarks "Redish" and "Bluish". The added bookmark "Less Red" also appears. The value associated with the "Less Red" bookmark is 0.799.

At a later time when the user desires to change the hue shift parameter using box 456, the user can invoke the list of bookmarks, as described above, and the user is presented with the updated list of bookmarks for the parameter. The user can then select among the bookmarked values. Alternatively, the user can hit swap bookmark values button 442 to switch between the last two bookmarks used for the current parameter, if any.

FIG. 8C illustrates the feature of converting a bookmark list to a flowgraph.

In FIG. 8C, flowgraph 460 is generated by a command from the user to create a flowgraph from a bookmark list. In this example, bookmark list 450 of FIG. 8B is used. Flowgraph 460 is created using whatever current image the user is working with, image 462. An instance of each bookmarked effect is created according to the parameter value, or values, in the list as a separate node. FIG. 8C shows nodes Redish 464, Bluish 466 and Less Red 468 that correspond to the list values in bookmark list 450. The currently selected bookmark is coupled to image 462 and to output node 470.

Another way to create a node from a bookmark is to place the pointer over a node. The user can then invoke any bookmarks for the node. A list of bookmarks associated with the node operation is shown. The user selects a bookmark from the list and the pointed-to node is then replaced with a node that uses the value(s) of the selected bookmark.

FIG. 9A showss a mapping space and subcubes illustrating a trilinear look-up table aspect of the present invention.

In FIG. 9A, mapping space 100 is a cubic volume used to conceptually illustrate the approach of the present invention to assign a (1) subcube resolution, (2) create subcubes according to the assigned resolution, (3) assign interpolated values to each subcube, and (4) use the subcubes within the mapping space to generate a look-up table.

In FIG. 9A, the three axes (i.e., dimensions) 102, 104 and 106 correspond to "red," "green," and "blue" (RGB) values that are inputs to a function. Note that the invention is adaptable for use with any type of function including nonlinear functions, functions with more than three variables, etc. First, a subcube resolution is chosen. In FIG. 9A, this resolution is shown as a resolution value, or length, 170. In a preferred embodiment the same resolution value is used for each of the three dimensions so that the space defined by the resolution is a cube, or subcube. However, different resolutions can be used for each dimension to define rectangular subspaces. Additionally, more complex definitions of subspaces can be used so that non-rectangular subspaces can be defined.

Once a subcube resolution has been selected, subcubes are conceptually defined to fill mapping space 100. For example, subcube 150 is defined by 8 vertices 122, 124, 126, 128, 130, 132, 134 and 136. Other subcubes are shown adjacent to subcube 150. As mentioned, all subcubes need not be at the same resolution. Subcubes at 160 are at a higher resolution (i.e., they are smaller) so that there are 8 subcubes occupying the same volume size as subcube 150. It is useful to use higher resolutions of subcubes, or subspaces, when a function's output does not change much over large areas of the mapping space. In general, any arrangement of subcubes is possible although departing from uniform cubic, or rectangular, subcubes complicates the generation and use of a look-up table based on the mapping space, as described below.

Once subcubes have been created, an output value is assigned to each subcube. In a preferred embodiment, linear interpolation is used to create a subcube value based on the 8 vertex values for the subcube. Two or more vertex values can be used to create an assigned subcube value. In general, any type of function, or method, can be used to assign subcube values. For example, subcube 150 is assigned a value v150. In practice, when an RGB set of values is submitted to the function being mapped, and the RGB values correspond to a point within subcube 150, then the mapped value (e.g., the return value of the function) is v150.

For example, with an RGB value set corresponding to points 108, 110 and 112; on axes 102, 104 and 106, respectively, the mapped input value set is a point 120 within subcube 150. Thus, the value returned for the function result is v150. Any value set that maps within subcube 150 will return the value v150 from the mapped function. Any value set that maps within a given subcube will return the assigned value for the given subcube. If a value set maps to a vertex then the vertex value is the value returned.

To generate a look-up table each subcube value is stored in a location in the table according to an indexing scheme. An indexing scheme uses a multiplier, "m," that is the extent of the mapping space dimensions (i.e., the maximum value that an input value can have) divided by the subspace resolution. For example, if the RBG values are 24-bit values, and the subcube resolution is set to 256, then m is 65,536. To index the look-up table the index, "n," is computed as n=G×(256×256)+B×256+R. The address to the lookup table return value for a given value set for RGB is then the base address of the look-up table+n.

Naturally, other ways to generate and access a look-up table are possible and are within the scope of the present invention.

Figure 9B:
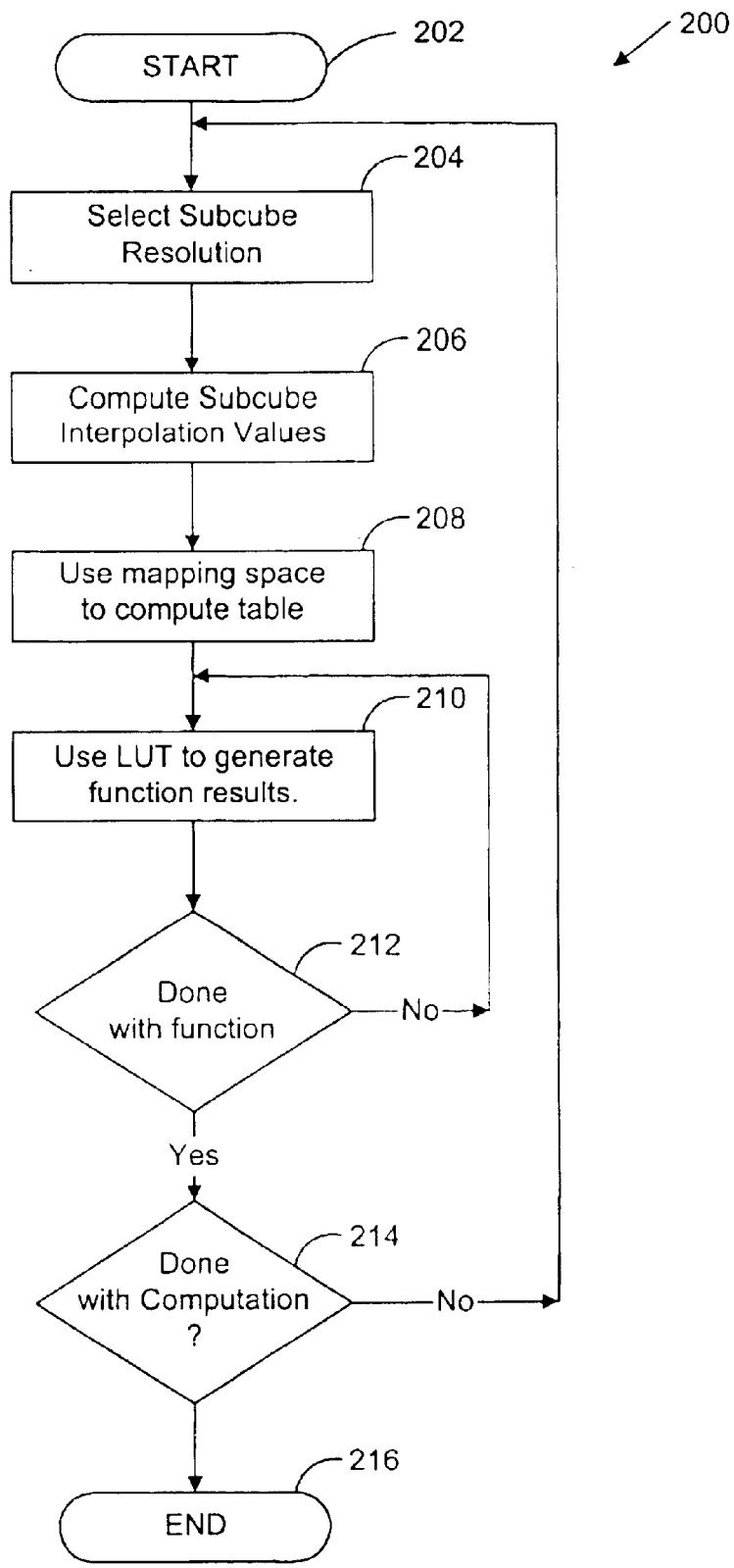
FIG. 9B is a flowchart showing basic steps of the present invention.

FIG. 9B is a flowchart showing basic steps of the present invention.

In FIG. 9B, flowchart 200 is entered at step 202 when it is desired to perform calculations using one or more functions that can benefit from the use of a trilinear look-up table according to the approach of the present invention.

First a subcube resolution is selected at step 204. Such selection can be by under human user control, or a default resolution based on the type of function to be performed can be used, etc. For example, to change the hue of an image it is often easier to map RGB values to hue, saturation, value (HSV) values and then perform the hue change. For every RGB value of each picture element (pixel) in an image, or series of images, the RGB value is converted to a hue value, the hue value modified, and the H value converted back to the RBG value set. Computation from RGB to hue values is very nonlinear and, thus, very computation intensive. In such a case a look-up table approach is very helpful.

Next, at step 206, subcube interpolated values are assigned. Step 208 is then executed to generate the LUT based on the subcube assigned values. A loop using steps 210 and 212 is continuously executed until all of the input value sets are processed using the LUT. At step 214 a check is made as to whether there are any more computations to be performed. A preferred embodiment makes use of successive iterations to improve efficiency.

In a preferred embodiment, an application program executes on a host computer system. The approach of the present invention is invoked whenever such LUT processing is desired. The LUT is stored in auxiliary memory different from the host processor's RAM as, for example, in a graphics accelerator card in communication with a computer system.

Basic Hardware

Figure 1D:
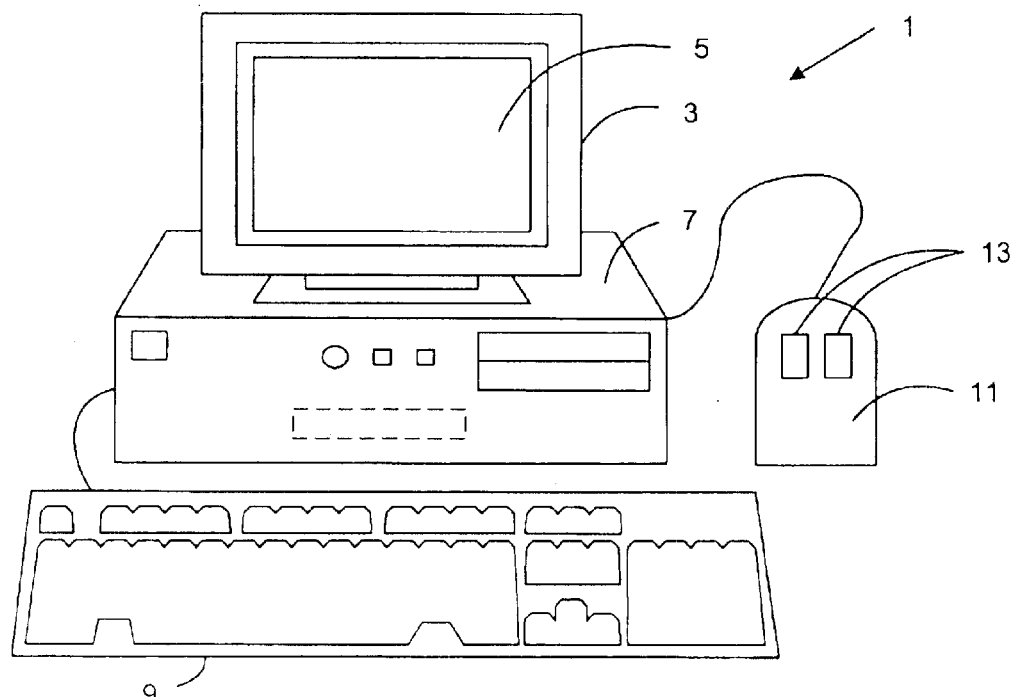
FIG. 1D shows a basic digital processing system suitable for use with aspects of the present invention.
Figure 1E:
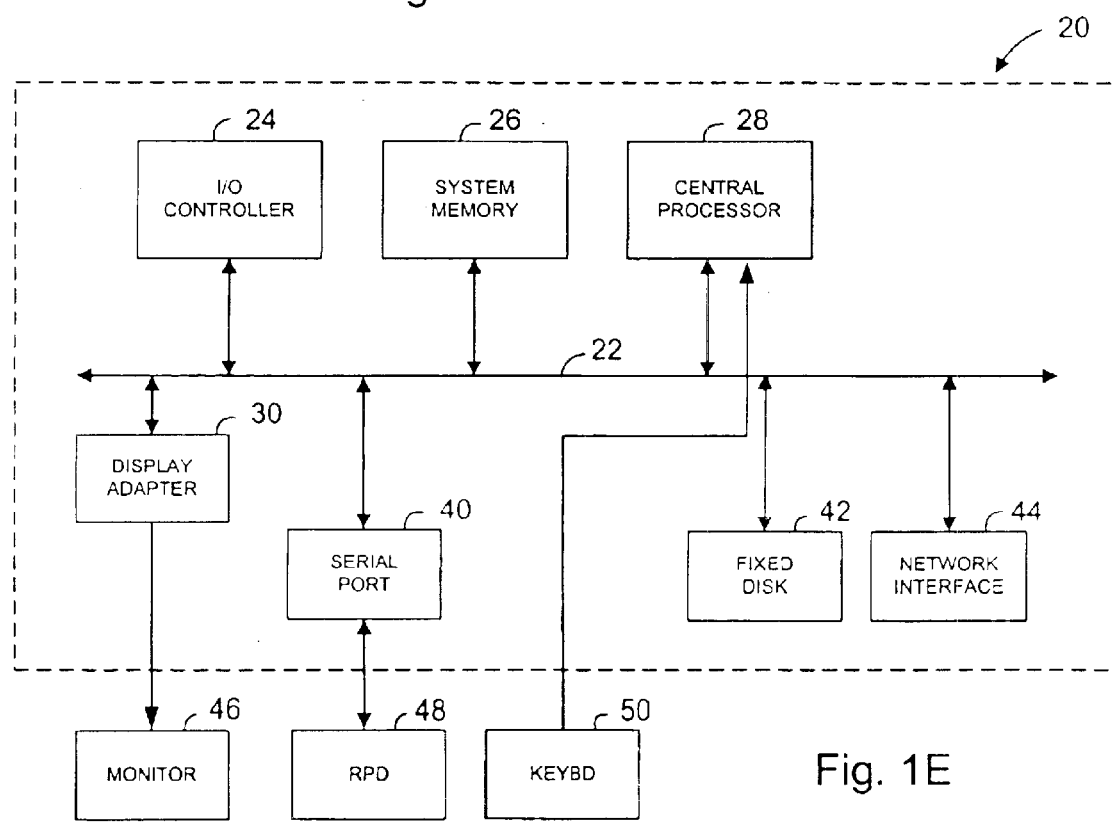
FIG. 1E illustrates basic hardware components suitable for practicing the present invention.

FIGS. 1D and 1E illustrate basic hardware components suitable for practicing the present invention.

FIG. 1D is an illustration of computer system 1 including display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. Other media presentation devices other than display screen 5 may be used such as projection displays, wearable computer monitor (e.g., "dataglass"), etc. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 1E illustrates subsystems that might typically be found in a computer such as computer 1.

In FIG. 1E, subsystems within box 20 are directly interfaced to internal bus 22. Such subsystems typically are contained within the computer system such as within cabinet 7 of FIG. 1D. Subsystems include input/output (I/O) controller 24, System Memory (or random access memory "RAM") 26, central processing unit CPU 28, Display Adapter 30, Serial Port 40, Fixed Disk 42, Network Interface Adapter 44. The use of bus 22 allows each of the subsystems to transfer data among subsystems and, most importantly, with the CPU. External devices can communicate with the CPU or other subsystems via bus 22 by interfacing with a subsystem on the bus. Thus, Monitor 46 connects with Display Adapter 30, a relative pointing device (e.g. a mouse) connects through Serial Port 40. Some devices such as Keyboard 50 can communicate with the CPU by direct means without using the main data bus as, for example, via an interrupt controller and associated registers.

As with the external physical configuration shown in FIG. 1D, many subsystem configurations are possible. FIG. 1E is illustrative of but one suitable configuration. Subsystems, components or devices other than those shown in FIG. 1E can be added. A suitable computer system can be achieved without using all of the subsystems shown in FIG. 1E. For example, a standalone computer need not be coupled to a network so Network Interface 44 would not be required. Other subsystems such as a CDROM drive, graphics accelerator, etc. can be included in the configuration without affecting the performance of the system of the present invention.

Although the present invention has been discussed with respect to specific embodiments thereof, these embodiments are merely illustrative, and not restrictive, of the invention. For example, many types of processing can use the approach of the present invention. Thus, the invention can be used with any type of application.

Any suitable programming language can be used to implement the routines of the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a functional aspect of the present invention.

Thus, the scope of the invention is to be determined solely by the appended claims.

What is claimed is:

1. A method for modifying a pixel value of a digital image, the method executing in a digital processing system, the method comprising accepting a signal from a user input device to indicate a first operation to be performed on a pixel;

displaying a result of the first operation on the pixel;

accepting a signal from a user input device to indicate a second operation to be performed on the pixel;

displaying a result of the first and second operations on the pixel;

maintaining an association between and operations;

displaying a visual sequence of the first and second operations on the display screen wherein a first visual indicator corresponds to the first operation and a second visual indicator corresponds to the second operation, and wherein the order of application of operations is shown, wherein the first operation includes multiple sub-operations;

displaying multiple expanded visual indicators in association with the first visual indicator, wherein the multiple expanded visual indicators correspond to the multiple sub-operations;

accepting a signal from a user input device to indicate modification of the visual sequence; and displaying a result of a corresponding change in application of the operations to the pixel in response to the modification of the visual sequence.

2. The method of claim 1, wherein the visual indicators include a flowgraph.

3. The method of claim 2, wherein the flowgraph includes nodes that correspond to operations, wherein the nodes are connected by connectors to show the order of execution of operations.

4. The method of claim 1, wherein modification of the visual sequence includes deletion of a visual indication of an operation.

5. The method of claim 1, wherein modification of the visual sequence includes addition of a visual indication of an operation.

6. The method of claim 1, wherein modification of the visual sequence includes changing an order of application of operations.

7. The method of claim 1, further comprising indicating the first and second operations as first and second nodes, respectively.

8. The method of claim 7, further comprising indicating the order of application of operations as a line connecting the first and second nodes.

9. The method of claim 8, wherein an order of application of operations is indicated with a directional indicator associated with the line.

10. The method of claim 9, wherein the directional indicator includes an arrow.

11. The method of claim 9, wherein the directional indicator includes an input port.

12. The method of claim 1, further comprising displaying a third visual indicator on the display screen that corresponds to a third operation;

accepting a signal from a user input device to define an ordering of the first, second and third visual indicators; and displaying a result of the pixel after applying the first, second and third operations in the defined ordering.

13. The method of claim 1, wherein an operation can include one or more of the following: brightness adjustment, clamp effect, contrast, convert, crop, dissolve, fade, gain, gamma, invert, CMY graph, luma graph, monochrome, offset and swap RGBA.

14. The method of claim 1, wherein an operation includes obtaining a pixel from a storage location.

15. The method of claim 1, wherein an operation includes an output operation.

16. An apparatus for modifying a pixel value of a digital image, the apparatus comprising a digital processor;

a display coupled to the digital processor;

an input device coupled to the digital processor;

a machine-readable medium including instructions for accepting a signal from a user input device to indicate a first operation to be performed on a pixel;

displaying a result of the first operation on the pixel;

accepting a signal from a user input device to indicate a second operation to be performed on the pixel;

displaying a result of the first and second operations on the pixel;

maintaining an association between and operations;

displaying a visual sequence of the first and second operations on the display screen wherein a first visual indicator corresponds to the first operation and a second visual indicator corresponds to the second operation, and wherein the order of application of operations is shown, wherein the first operation includes multiple sub-operations;

displaying multiple expanded visual indicators in association with the first visual indicator, wherein the multiple expanded visual indicators correspond to the multiple sub-operations;

accepting a signal from a user input device to indicate modification of the visual sequence; and displaying a result of a corresponding change in application of the operations to the pixel in response to the modification of the visual sequence.

17. A machine-readable medium including instructions for modifying a pixel value of a digital image, the medium comprising one or more instructions for accepting a signal from a user input device to indicate a first operation to be performed on a pixel;

one or more instructions for displaying a result of the first operation on the pixel;

one or more instructions for accepting a signal from a user input device to indicate a second operation to be performed on the pixel;

one or more instructions for displaying a result of the first and second operations on the pixel;

one or more instructions for maintaining an association between and operations;

one or more instructions for displaying a visual sequence of the first and second operations on the display screen wherein a first visual indicator corresponds to the first operation and a second visual indicator corresponds to the second operation, and wherein the order of application of operations is shown, wherein the first operation includes multiple sub-operations;

displaying multiple expanded visual indicators in association with the first visual indicator, wherein the multiple expanded visual indicators correspond to the multiple sub-operations;

one or more instructions for accepting a signal from a user input device to indicate modification of the visual sequence; and one or more instructions for displaying a result of a corresponding change in application of the operations to the pixel in response to the modification of the visual sequence.

* * * * *